US012630308B2

(12) United States Patent
Aston et al.

(10) Patent No.: US 12,630,308 B2
(45) Date of Patent: May 19, 2026

(54) ADDITIVELY MANUFACTURED AEROSPACE PANELS AND METHODS

(71) Applicant: The Boeing Company, Arlington, VA (US)

(72) Inventors: Richard W. Aston, Brea, CA (US); Rachel E. Zilz, Redondo Beach, CA (US); Nicole M. Jain, Hermosa Beach, CA (US); Emily C. Woods, Redondo Beach, CA (US); Trevor J. Wieber, San Jose, CA (US); Mara Pearson, Seattle, WA (US); Trent M. Aston, Steilacoom, WA (US)

(73) Assignee: The Boeing Company, Arlington, VA (US)

( * ) Notice: Subject to any disclaimer, the term of this patent is extended or adjusted under 35 U.S.C. 154(b) by 180 days.

(21) Appl. No.: 18/484,707

(22) Filed: Oct. 11, 2023

(65) Prior Publication Data

US 2025/0121957 A1     Apr. 17, 2025

(51) Int. Cl.
| | |
|---|---|
| *B64G 1/22* | (2006.01) |
| *B33Y 10/00* | (2015.01) |
| *B33Y 80/00* | (2015.01) |
| *B64G 1/10* | (2006.01) |
| *E04B 1/19* | (2006.01) |

(52) U.S. Cl.
CPC ................ *B64G 1/22* (2013.01); *B33Y 10/00* (2014.12); *B33Y 80/00* (2014.12); *E04B 1/19* (2013.01); *Y10T 428/24149* (2015.01); *Y10T 428/24322* (2015.01)

(58) Field of Classification Search
CPC .......... B64G 1/22; B33Y 10/00; B33Y 80/00; E04B 1/19; Y10T 428/24149; Y10T 428/24322
See application file for complete search history.

(56) References Cited

U.S. PATENT DOCUMENTS

| | | | | |
|---|---|---|---|---|
| 7,424,967 B2 * | 9/2008 | Ervin | ........................ | B32B 3/12 428/116 |
| 11,542,041 B2 | 1/2023 | Aston et al. | | |

(Continued)

FOREIGN PATENT DOCUMENTS

| | | |
|---|---|---|
| CN | 105667837 | 6/2016 |
| CN | 106694884 | 5/2017 |

(Continued)

OTHER PUBLICATIONS

European Patent Office, "Communication pursuant to Article 94(3) EPC," App. No. 20 189 687.5 (May 28, 2024).

(Continued)

*Primary Examiner* — Donald M Flores, Jr.
(74) *Attorney, Agent, or Firm* — Walters & Wasylyna LLC

(57) ABSTRACT

An aerospace panel includes a first skin, a second skin spaced apart from the first skin, and a first truss structure connecting the first skin to the second skin. The first truss structure includes a plurality of truss members. Each truss member is integral with the first skin and the second skin, such that the first skin, the second skin, and the first truss structure collectively form a single monolithic joint-free structure. At least one of the skins also includes at least one lattice region that includes a lattice grid and an array of openings.

20 Claims, 19 Drawing Sheets

(56)　　　　　References Cited

U.S. PATENT DOCUMENTS

| | | | |
|---|---|---|---|
| 2009/0282773 | A1 | 11/2009 | Queheillalt et al. |
| 2015/0175210 | A1* | 6/2015 | Raymond .............. B62D 25/02 |
| | | | 29/897.2 |
| 2016/0208476 | A1 | 7/2016 | Scholz |
| 2018/0037342 | A1 | 2/2018 | Dong et al. |
| 2018/0207726 | A1 | 7/2018 | Robrecht et al. |
| 2019/0202163 | A1 | 7/2019 | Yeh et al. |
| 2020/0361635 | A1 | 11/2020 | Braun et al. |
| 2021/0061495 | A1* | 3/2021 | Aston ................... B22F 3/1115 |
| 2021/0354856 | A1 | 11/2021 | Aston et al. |
| 2021/0354859 | A1* | 11/2021 | Aston .................... B64G 99/00 |
| 2021/0356015 | A1 | 11/2021 | Aston et al. |
| 2022/0194632 | A1 | 6/2022 | Aston et al. |
| 2022/0194635 | A1 | 6/2022 | Aston et al. |
| 2023/0054310 | A1* | 2/2023 | Aston ................... B29C 64/124 |

FOREIGN PATENT DOCUMENTS

| | | | |
|---|---|---|---|
| CN | 106694884 | A1 | 5/2017 |
| CN | 108801737 | A | 11/2018 |
| CN | 109 317 677 | | 2/2019 |
| CN | 109823508 | A | 5/2019 |
| CN | 209290656 | U | 8/2019 |
| EP | 3 034 208 | | 6/2016 |
| JP | 2000-128092 | | 5/2000 |
| JP | 2002-120310 | | 4/2002 |
| JP | 2010-201965 | | 9/2010 |
| JP | 2016-013667 | | 1/2016 |

OTHER PUBLICATIONS

Zhang et al: "Vibration Test of 3D Printed Satellite Structure Made of Lattice Sandwich Panel," *AIAA Journal*, vol. 56, No. 10, pp. 4213-4217 (Oct. 1, 2018).
Moore et al: "Fundamentals of Space Systems," *The John Hopkins University, Applied Physics Laboratory Series in Science and Engineering, Oxford University Press*, pp. 712-717 (1994).
Japan Patent Office, Office Action, with English translation, App. No. 2020-121996 (Apr. 1, 2024).
China National Intellectual Property Administration, Office Action, App. No. 202010878198.9 (Feb. 13, 2025).
European Patent Office, Extended European Search Report, App. No. 24205220.7 (Feb. 11, 2025).
China National Intellectual Property Administration, Office Action, App. No. 202010878198.9 (Jun. 21, 2025).
European Patent Office, Extended European Search Report, App. No. 25174650.9 (Dec. 16, 2025).

* cited by examiner

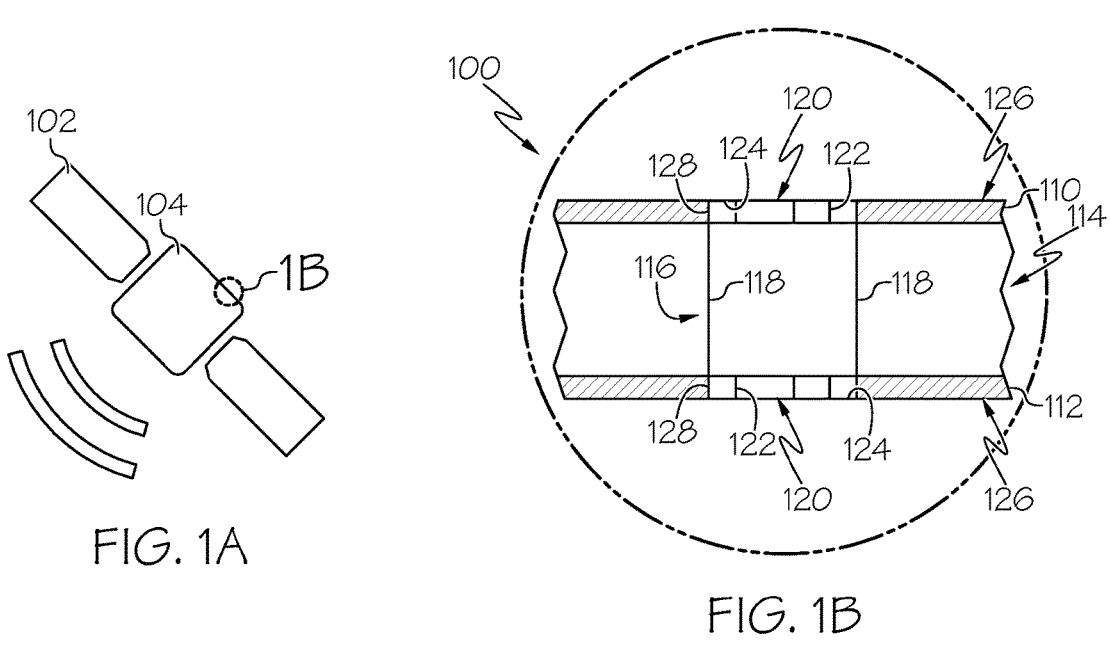
FIG. 1A
FIG. 1B
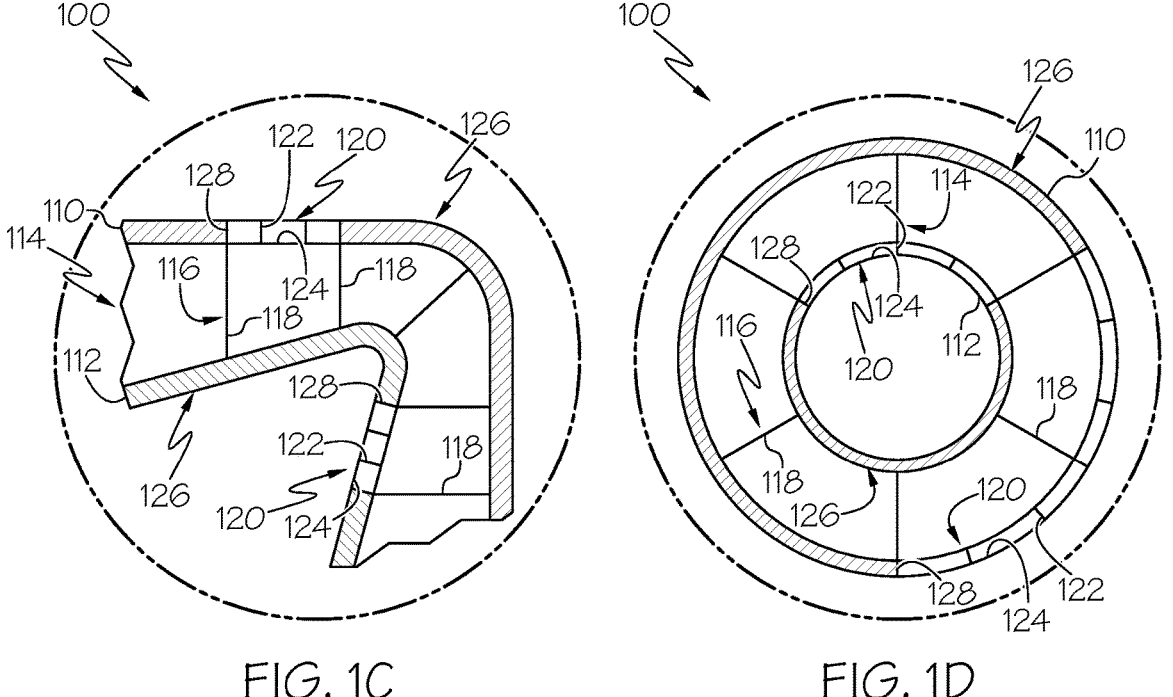
FIG. 1C
FIG. 1D

500

| RECEIVE DIGITAL INFORMATION DESCRIBING AN ORDERED PLURALITY | 510 |

| DEPOSIT RAW MATERIAL ON A BUILD PLATFORM | 512 |

| ALTER THE RAW MATERIAL TO PRODUCE THE FIRST LAYER | 514 |

| REPOSITION THE BUILD PLATFORM | 516 |

| DEPOSIT RAW MATERIAL ON THE PRODUCED LAYER | 518 |

| ALTER THE RAW MATERIAL TO PRODUCE THE NEXT LAYER | 520 |

ADDITIVELY MANUFACTURED AEROSPACE PANELS AND METHODS

FIELD

The present disclosure relates generally to aerospace structures and, more particularly, to additively manufactured aerospace panels and methods for additively manufacturing aerospace panels.

BACKGROUND

Aerospace presents a uniquely hostile environment for vehicles. Space is a very hostile environment for spacecraft, such as satellites. Thermal management in particular is challenging in space or in high-speed applications, in addition to the danger of damaging radiation and foreign object damage (e.g., from orbital debris impacts). Many aerospace vehicles are constructed of composite materials, such as sandwich-structure panels, which are strong and light. However, such panels typically include a core material bonded between two thin skins, which results in high thermal impedance. Composite sandwich-structure panels can also be expensive and labor intensive to manufacture. Wrapping and extraction of tooling, precise placement of individual plies, and multiple stages of curing and layup each require significant time and touch labor. For localized features such as shielding and reinforcement, separate parts are attached post-production, requiring further expense and labor.

Additive Manufacturing (AM) is quickly gaining popularity in many industries as a method of rapid production at relatively low cost. AM, sometimes known as 3D printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often the raw material is in the form of granules or powder, applied as a layer, and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include, for example, thermoplastic polymer, thermoset polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM), among others.

Conventional part designs used for subtractive manufacturing or composite laminate construction may be inefficient or even unworkable for AM. Depending on the process and material used, unsupported features may collapse, delicate features may be rendered with insufficient clarity, and/or warping and cracking may occur. New designs maintaining functionality of conventional parts while enabling efficient use of AM methods are needed.

SUMMARY

Disclosed are examples of an aerospace panel, an aerospace vehicle, and examples of systems, apparatuses, and methods relating to additively manufactured aerospace panels. The following is a non-exhaustive list of examples, which may or may not be claimed, of the subject matter according to the present disclosure.

In one or more examples, the disclosed aerospace panel includes: a first skin; a second skin spaced apart from the first skin; and a first truss structure connecting the first skin to the second skin. The first truss structure includes a plurality of truss members. Each truss member is integral with the first skin and the second skin, such that the first skin, the second skin, and the first truss structure collectively form a single monolithic joint-free structure. At least one of the first skin and the second skin includes at least one lattice region defining a lattice configured to eliminate secondary printing support. The at least one lattice region includes a lattice grid and an array of openings.

In one or more examples of the disclosed aerospace panel, the first skin has a first grid of stiffeners, the second skin has a second grid of stiffeners, and each truss member extends between a first node, defined at an intersection of the first grid of stiffeners, and a second node, defined at an intersection of the second grid of stiffeners. In the at least one lattice region, the lattice grid includes one or more grids of lattice stiffeners.

In one or more examples of the disclosed aerospace panel, the first grid of stiffeners defines one or more first grid squares. The second grid of stiffeners defines one or more second grid squares. The first grid squares are offset from the second grid squares in a manner such that when the aerospace panel is viewed along a direction normal to the first skin, each one of the first nodes is aligned with a geometric center of one of the second grid squares. The one or more grids of lattice stiffeners defines one or more lattice grid squares corresponding to either the one or more first grid squares or the one or more second grid squares for the skin in which the grid of lattice stiffeners is located.

In one or more examples of the disclosed aerospace panel, at least one of the first grid of skin stiffeners and the second grid of skin stiffeners is non-planar.

In one or more examples, the disclosed aerospace panel includes a closeout wall extending between the first skin and the second skin along at least one edge of the aerospace panel. The first skin, the second skin, the first truss structure, and the closeout wall collectively form the single monolithic joint-free structure.

In one or more examples of the disclosed aerospace panel, the plurality of truss members includes a plurality of X-shaped truss members. Each one of the X-shaped truss members extends between a pair of first nodes on the first skin and a pair of second nodes on the second skin.

In one or more examples of the disclosed aerospace panel, the plurality of truss members forms an array of core structures. The density of the core structures varies over at least one region of the aerospace panel.

In one or more examples, the disclosed aerospace panel includes a third skin spaced apart from the second skin and a second truss structure connecting the second skin to the third skin. The first skin, the second skin, the third skin, the first truss structure, and the second truss structure collectively form the single monolithic joint-free structure.

In one or more examples, the disclosed aerospace panel has a primary axis parallel to a lengthwise direction of the first skin and the second skin and a secondary axis perpendicular to the primary axis and normal to the first skin and the second skin. Each one of the truss members is oriented at a first truss angle of approximately 35-50 degrees relative to the secondary axis when the aerospace panel is viewed along a direction perpendicular to both the primary axis and the secondary axis. Each one of the truss members is oriented at a second truss angle of approximately 35-50 degrees relative to the secondary axis when the aerospace panel is viewed along the primary axis.

In one or more examples of the disclosed aerospace panel, at least one of the first skin and the second skin has an internal channel embedded respectively in the first skin and/or the second skin.

In one or more examples, the disclosed aerospace vehicle includes a body having one or more aerospace panels. Each one of the aerospace panels includes a first skin, a second skin spaced apart from the first skin, and a first truss structure connecting the first skin to the second skin. The first truss structure includes a plurality of truss members. Each one of the truss members is integral with the first skin and the second skin, such that the first skin, the second skin, and the first truss structure collectively form a single monolithic joint-free structure. At least one of the first skin and the second skin includes at least one lattice region defining a lattice configured to eliminate secondary printing support. The at least one lattice region includes a grid of lattice stiffeners and an array of openings.

In one or more examples, the disclosed method for manufacturing an aerospace panel includes steps of printing a first skin and a second skin spaced apart from the first skin, while simultaneously printing a plurality of truss members of a first truss structure connecting the first skin to the second skin, thereby resulting in a single monolithic joint-free structure. At least one of the first skin and the second skin includes at least one lattice region defining a lattice configured to eliminate secondary printing support. The at least one lattice region includes a lattice grid and an array of openings.

In one or more examples of the disclosed method, the step of printing the first skin and printing the second skin respectively includes a step of printing a first grid of stiffeners with the first skin and a step of printing a second grid of stiffeners with the second skin. The step of printing the plurality of truss members includes a step of printing each truss member to extend between a first node, defined at an intersection of the first grid of stiffeners, and a second node, defined at an intersection of the second grid of stiffeners.

In one or more examples of the disclosed method, the step of printing the first grid of stiffeners and the step of printing the second grid of stiffeners, respectively, include a step of printing the first grid of stiffeners to form one or more first grid squares and a step of printing the second grid of stiffeners to one or more second grid squares. The first grid squares are offset from the second grid squares in a manner such that when the aerospace panel is viewed along a direction normal to the first skin, each one of the first nodes is aligned with a geometric center of one of the second grid squares. The one or more grids of lattice stiffeners form one or more lattice grid squares corresponding to either the one or more first grid squares or the one or more second grid squares for the skin in which the grid of lattice stiffeners is located.

In one or more examples, the disclosed method includes a step of printing a closeout wall while printing the first skin, the second skin, and the first truss structure. The closeout wall extending between the first skin and the second skin along at least one edge of the aerospace panel.

In one or more examples of the disclosed method, the step of printing the plurality of truss members includes a step of printing a plurality of X-shaped truss members. Each one of the X-shaped truss members extending between a pair of first nodes on the first skin and a pair of second nodes on the second skin.

In one or more examples of the disclosed method, the step of printing the plurality of truss members includes a step of printing the plurality of truss members as an array of core structures that varies in density over at least one region of the aerospace panel.

In one or more examples, the disclosed method includes a step of printing a third skin spaced apart from the second skin and a step of printing a second truss structure connecting the second skin to the third skin, while printing the first skin, the second skin, and the first truss structure.

In one or more examples of the disclosed method, the aerospace panel has a primary axis parallel to a lengthwise direction of the first skin and the second skin and a secondary axis perpendicular to the primary axis and normal to the first skin and the second skin. The step of printing the plurality of truss members includes a step of printing each one of the truss members at a first truss angle of approximately 35-50 degrees relative to the secondary axis, when the aerospace panel is viewed along a direction perpendicular to both the primary axis and the secondary axis, and at a second truss angle of approximately 35-50 degrees relative to the secondary axis, when the aerospace panel is viewed along the primary axis.

In one or more examples of the disclosed method, the step of printing the first skin and the second skin includes a step of printing at least one of the first skin and the second skin with an internal channel embedded in the first skin and/or the second skin.

In one or more examples of the disclosed method, the step of printing the first skin, the second skin, and the first truss structure includes a step of printing, using an additive manufacturing apparatus, the aerospace panel in a manner such that the lengthwise direction of the first skin and the second skin is parallel to a build direction of the additive manufacturing apparatus.

Features, functions, and advantages may be achieved independently in various examples of the present disclosure, or may be combined in yet other examples, further details of which can be seen with reference to the following description and drawings. Other examples of the aerospace panel, the aerospace vehicle, and the methods disclosed herein, will become apparent from the following detailed description, the accompanying drawings, and the appended claims.

BRIEF DESCRIPTION OF THE DRAWINGS

FIG. 1A is a schematic illustration of an example of an aerospace vehicle;

FIG. 1B is a schematic illustration of an example of a portion of an additively manufactured aerospace panel of the aerospace vehicle;

FIG. 1C is a schematic illustration of an example of a portion of the additively manufactured aerospace panel of the aerospace vehicle;

FIG. 1D is a schematic illustration of an example of a portion of the additively manufactured aerospace panel of the aerospace vehicle;

5

Figure 5:
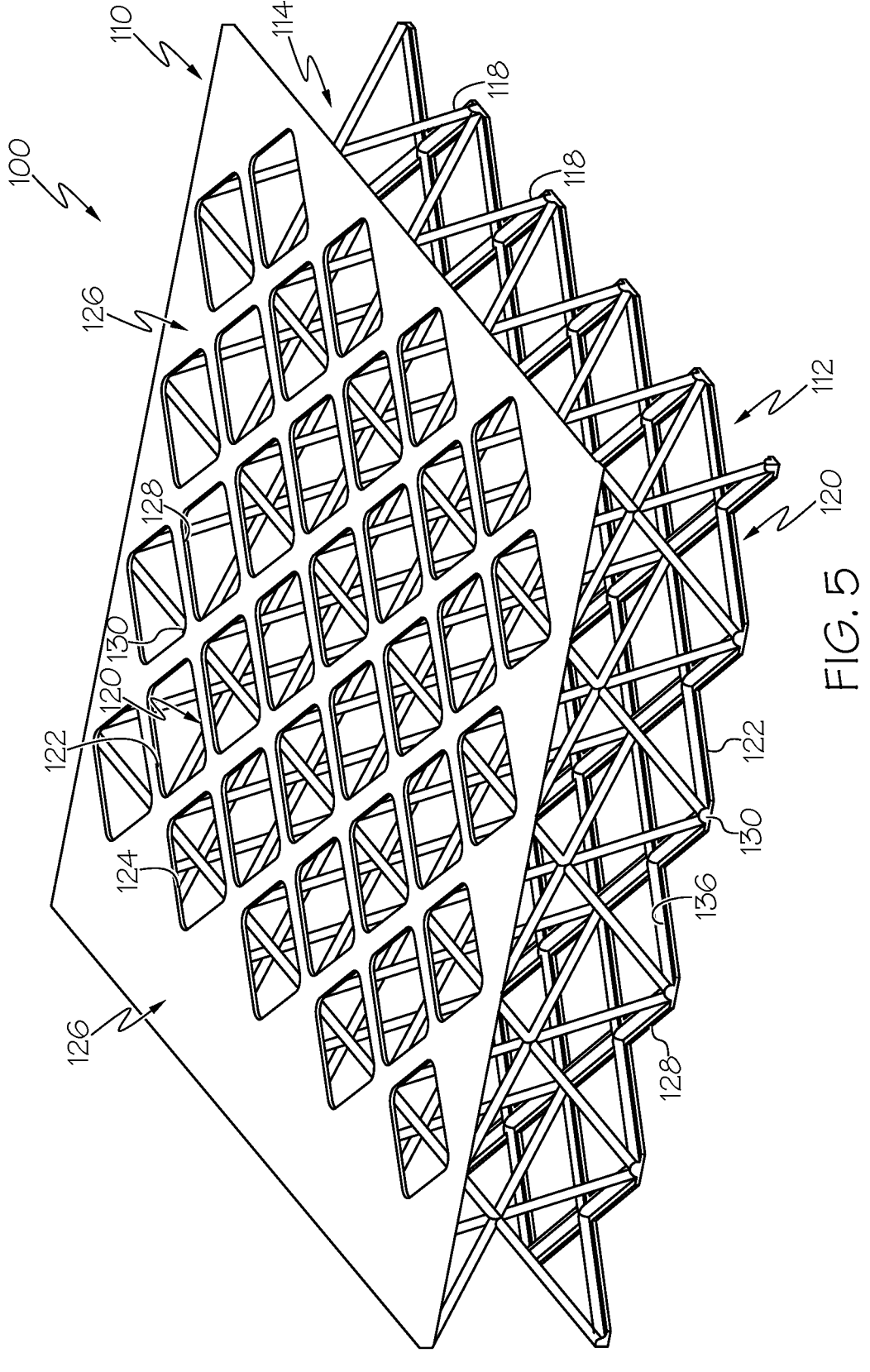
Figure 6:
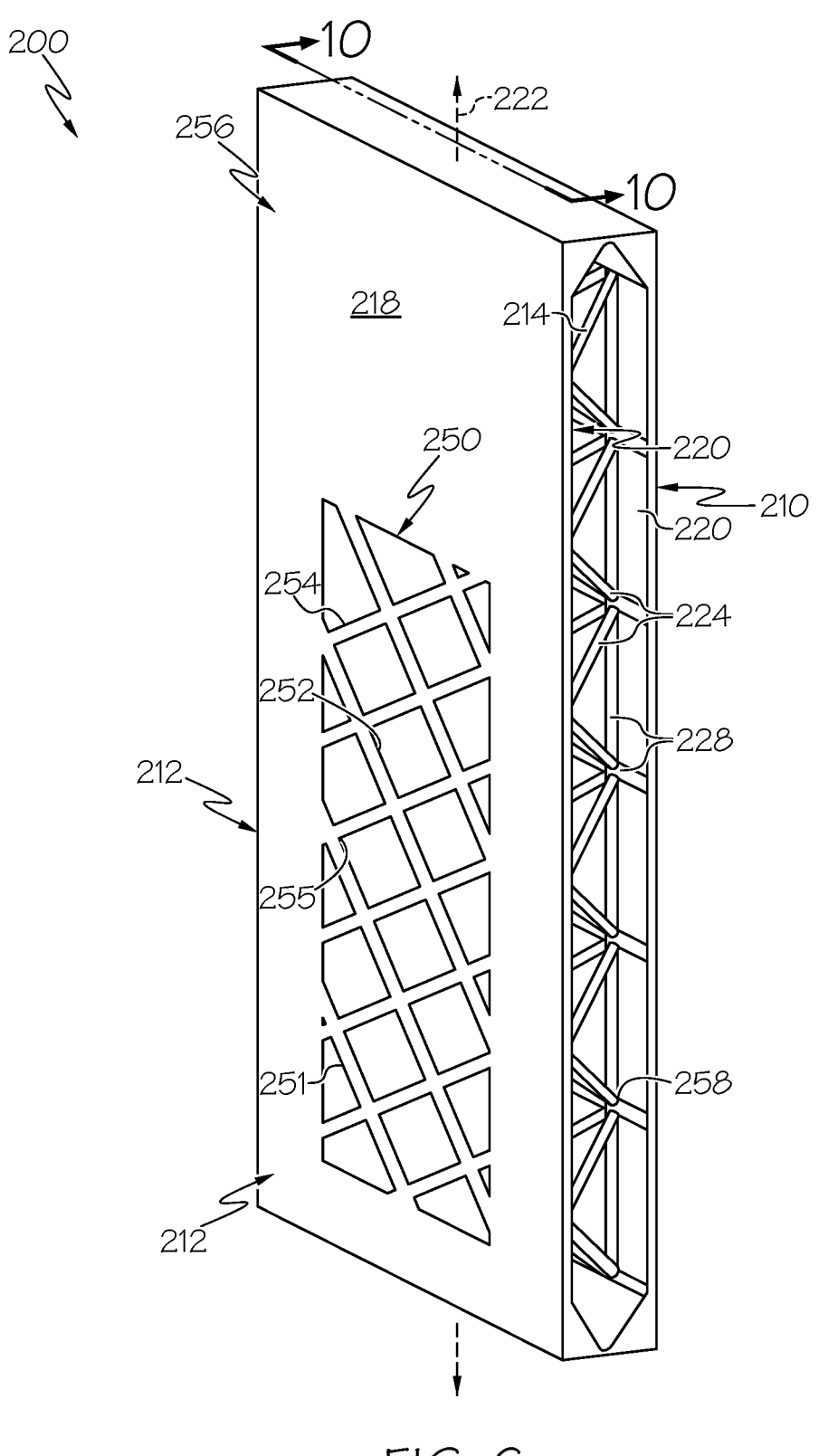
Figure 7:
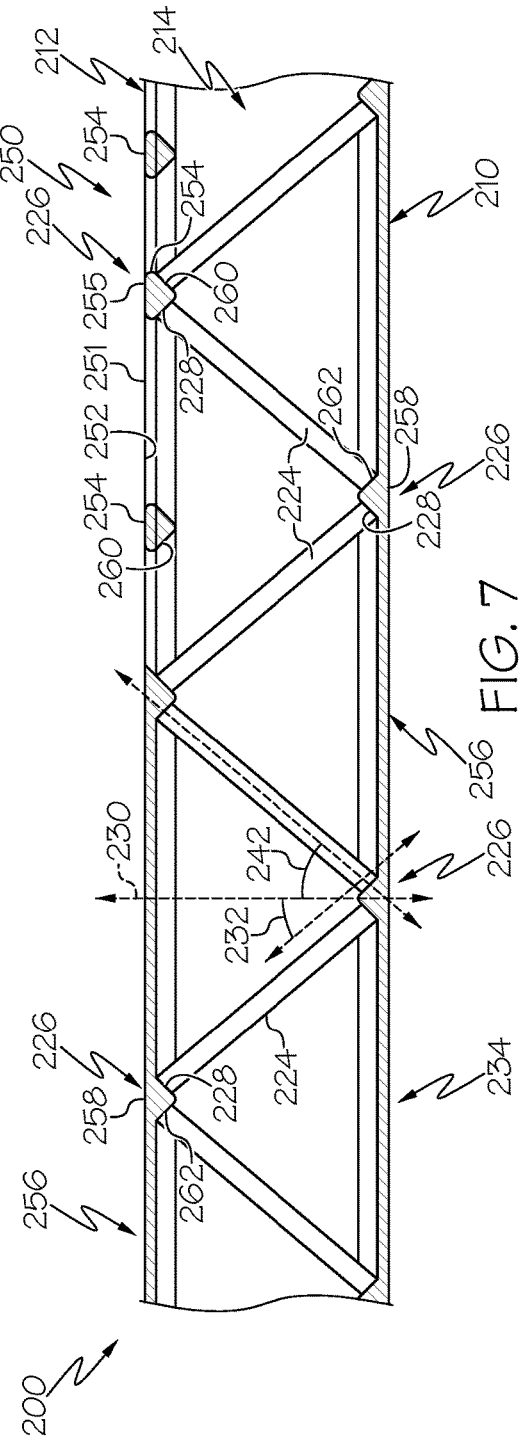
Figure 8:
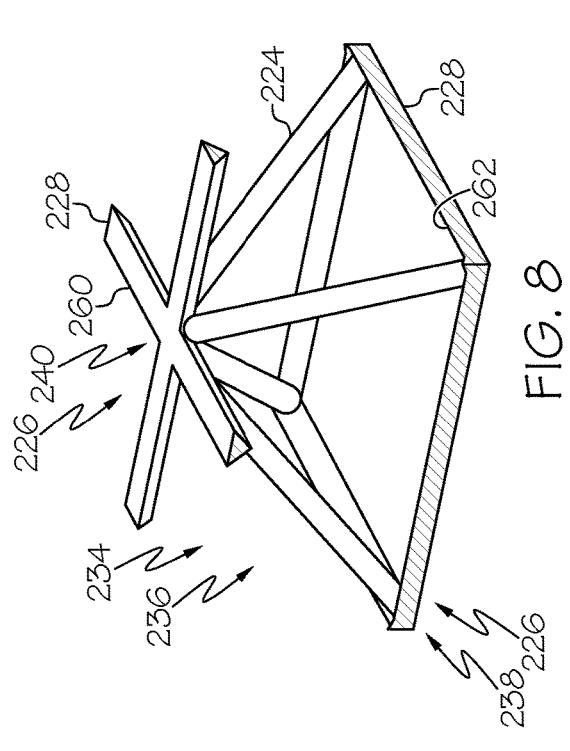
Figures 9, 10:
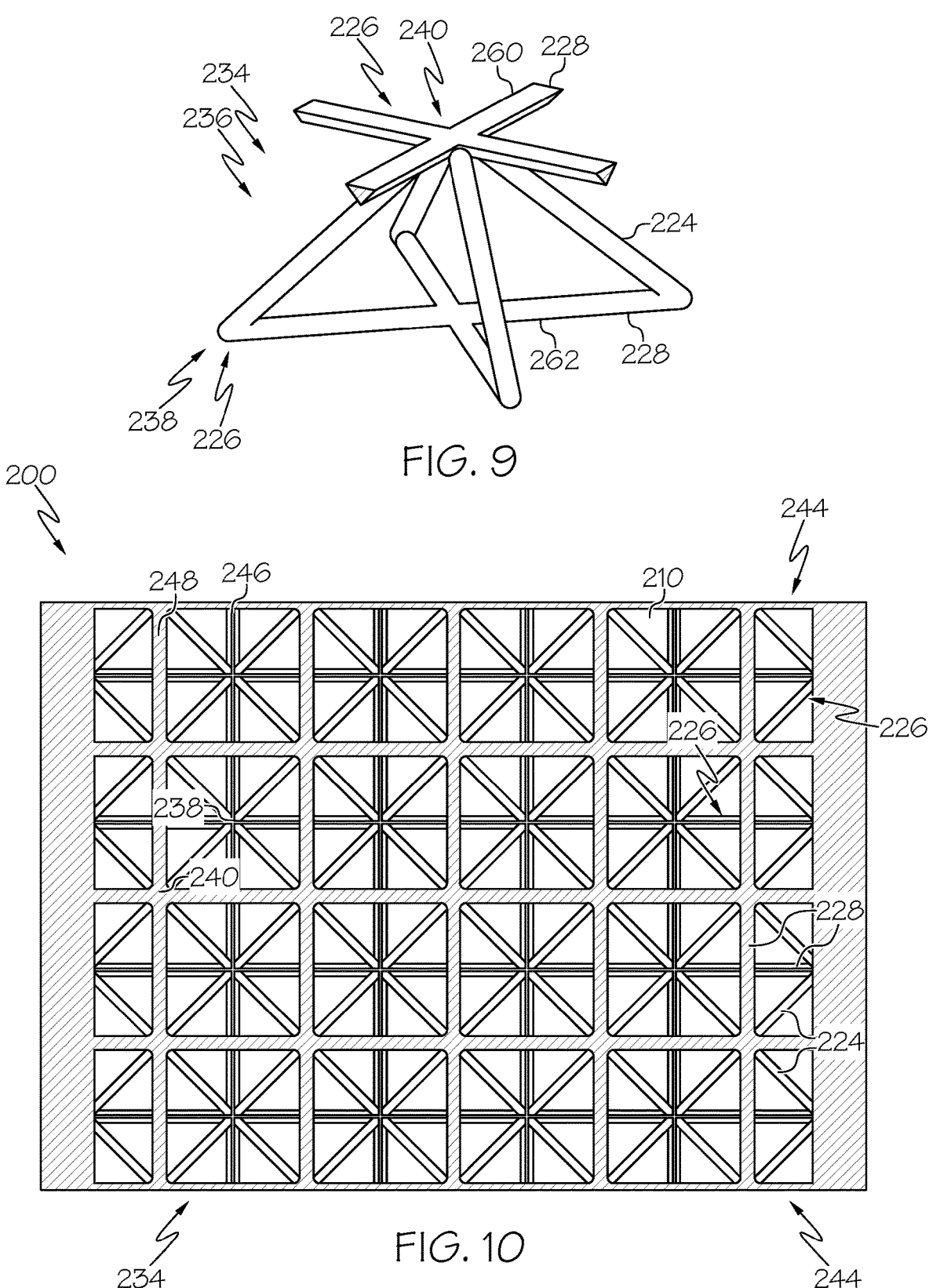
Figures 11, 12:
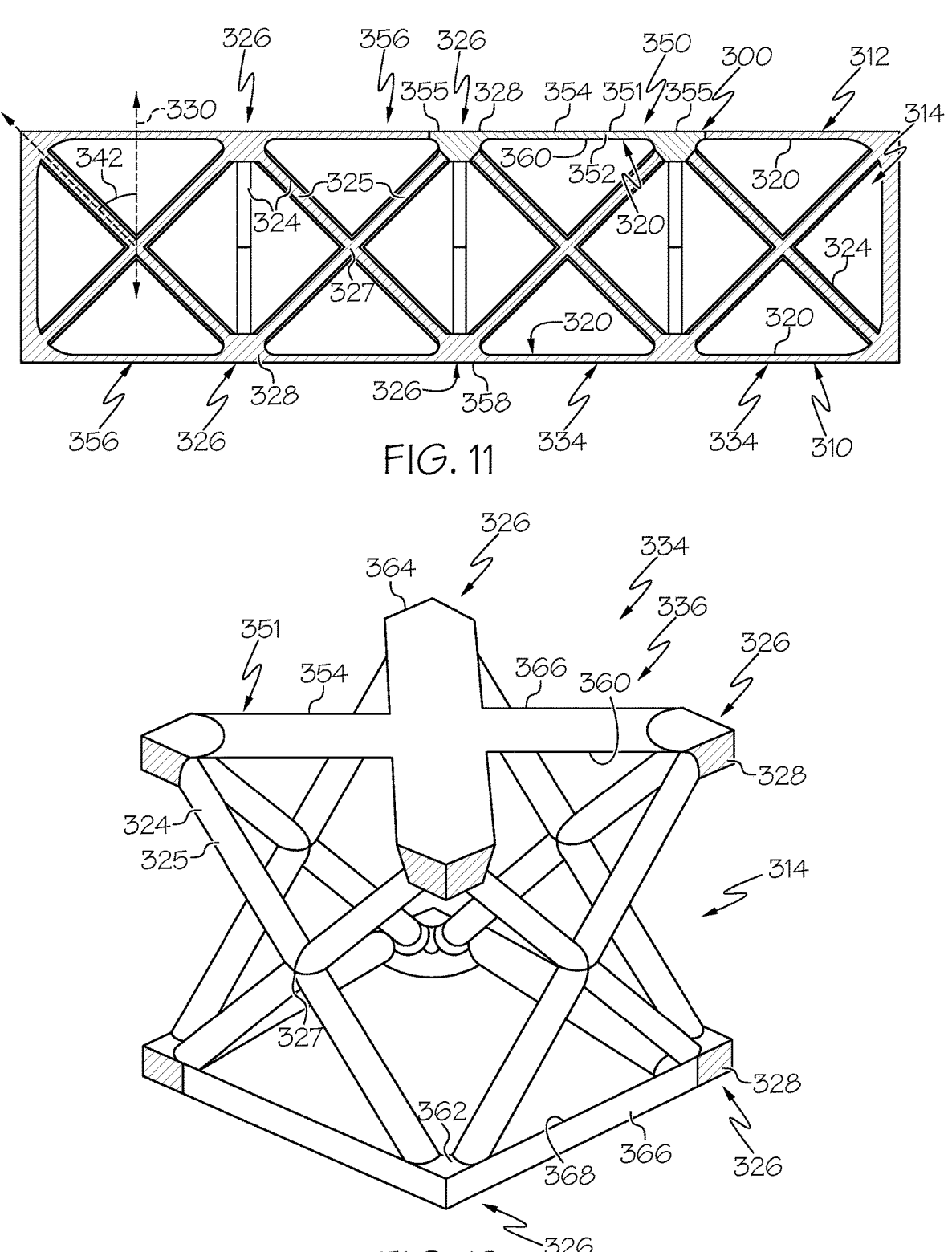
Figure 13:
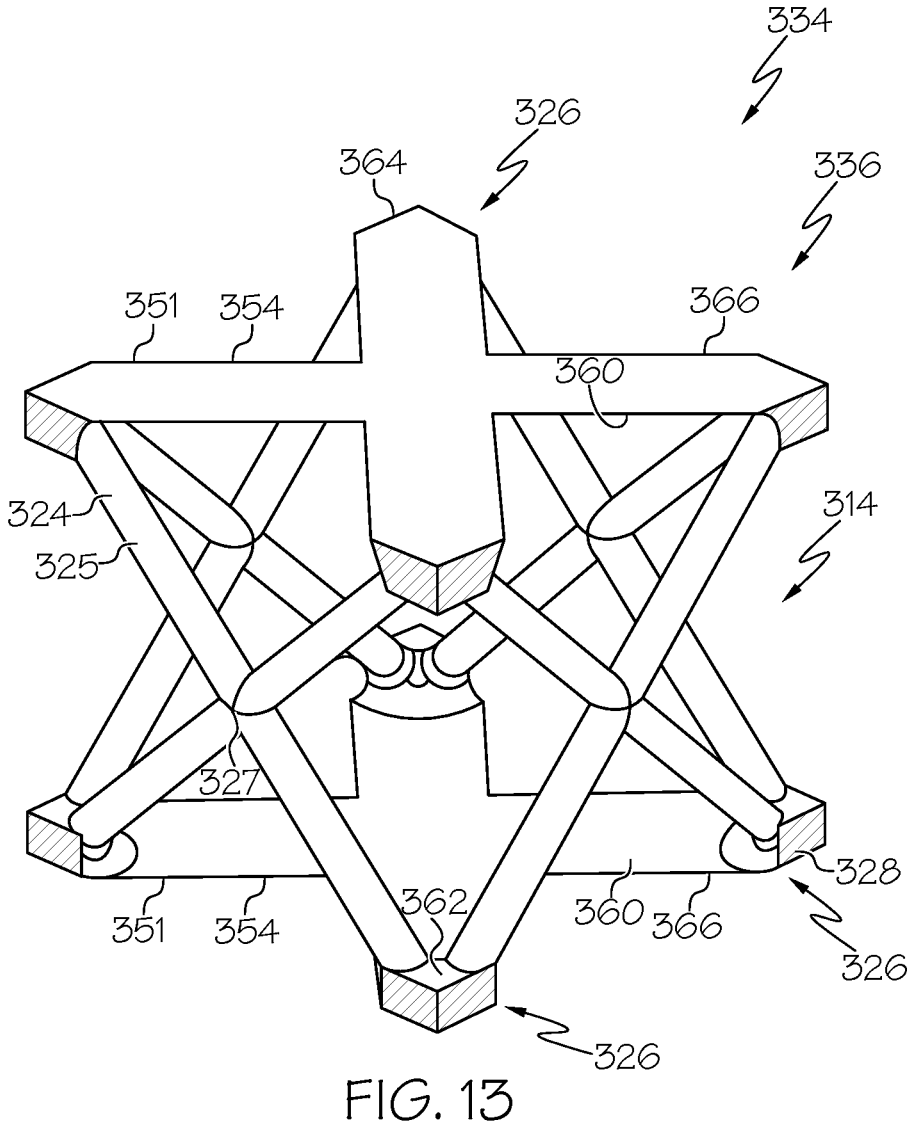
Figures 14, 15:
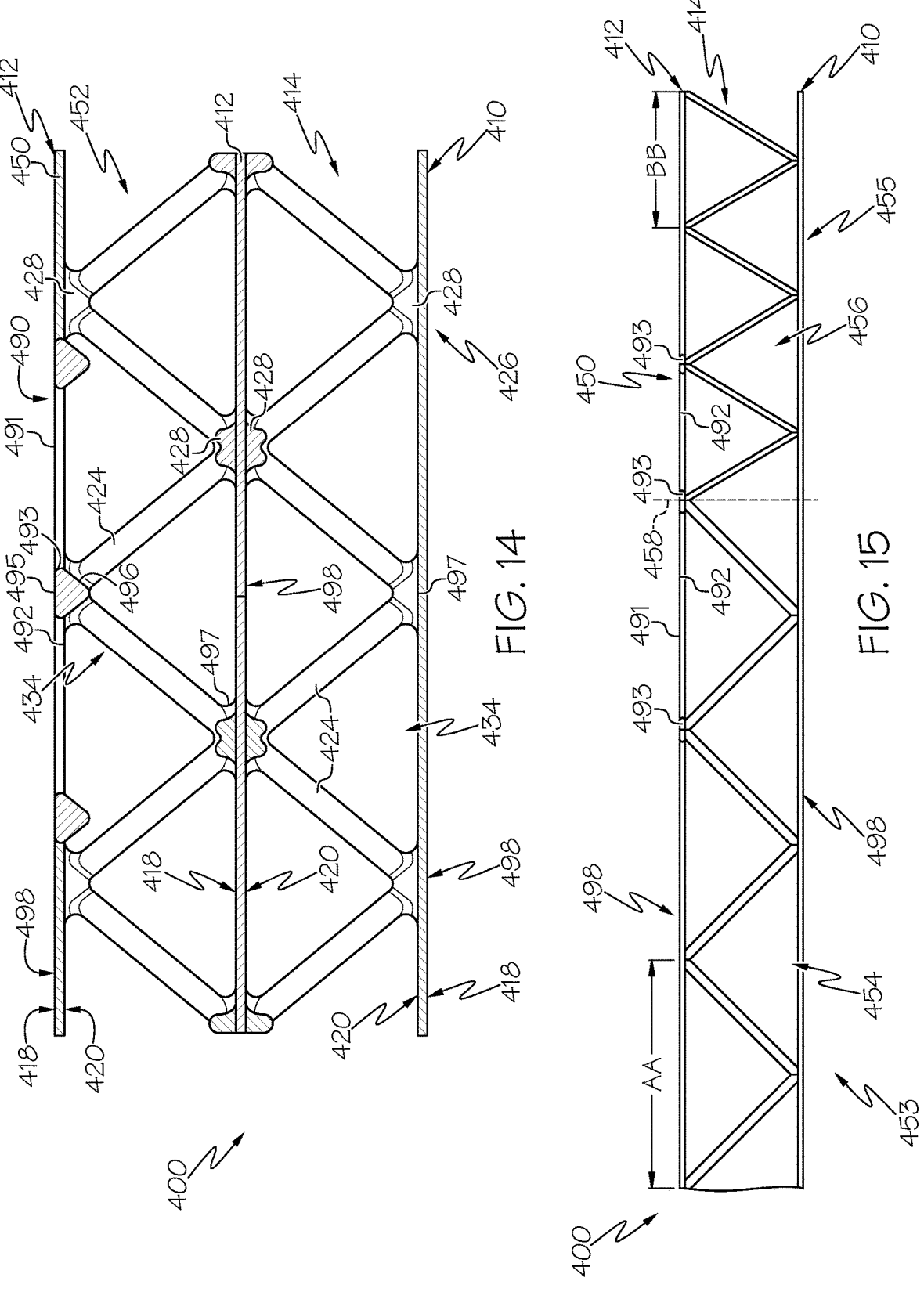
Figures 16, 17:
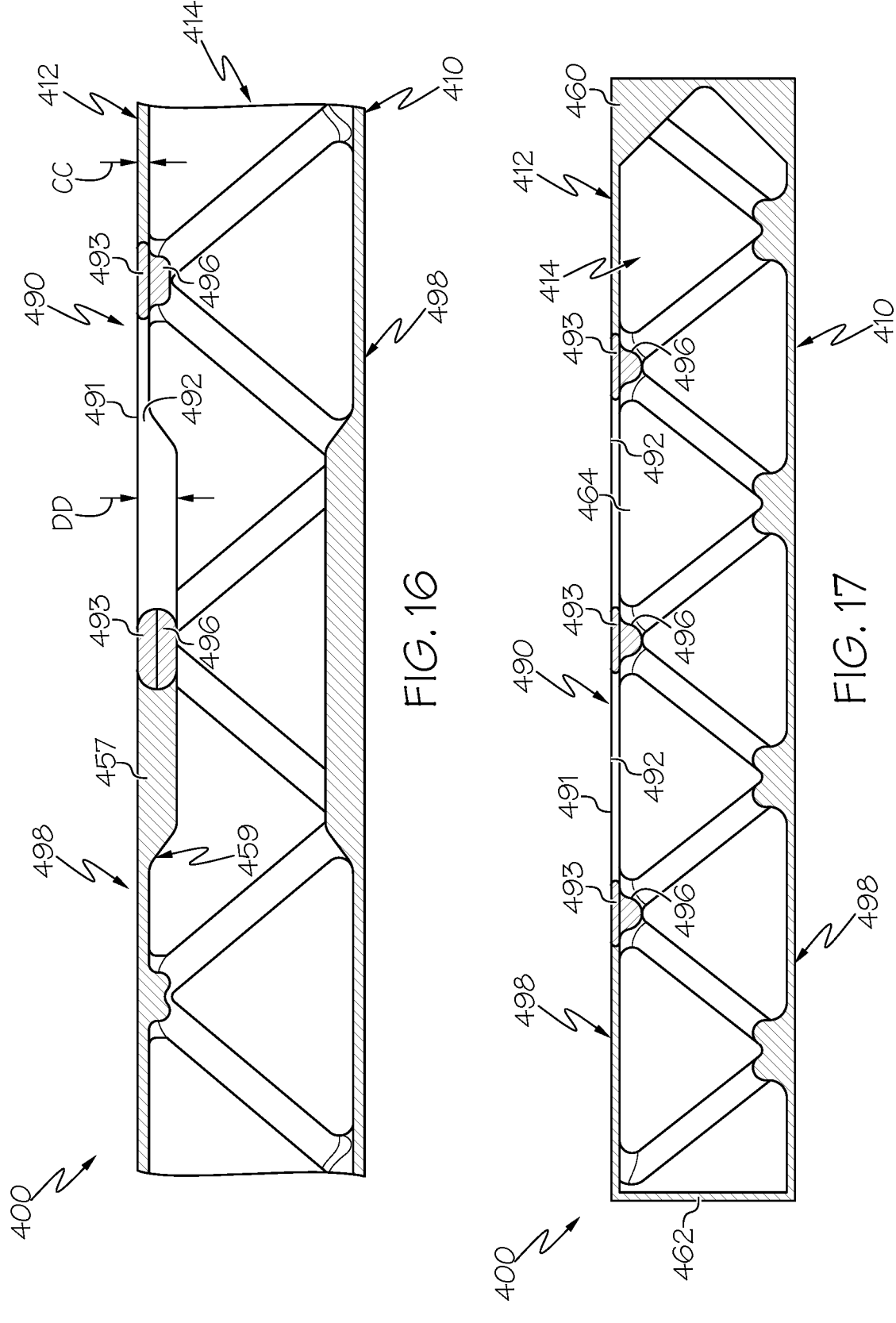
Figures 18, 19:
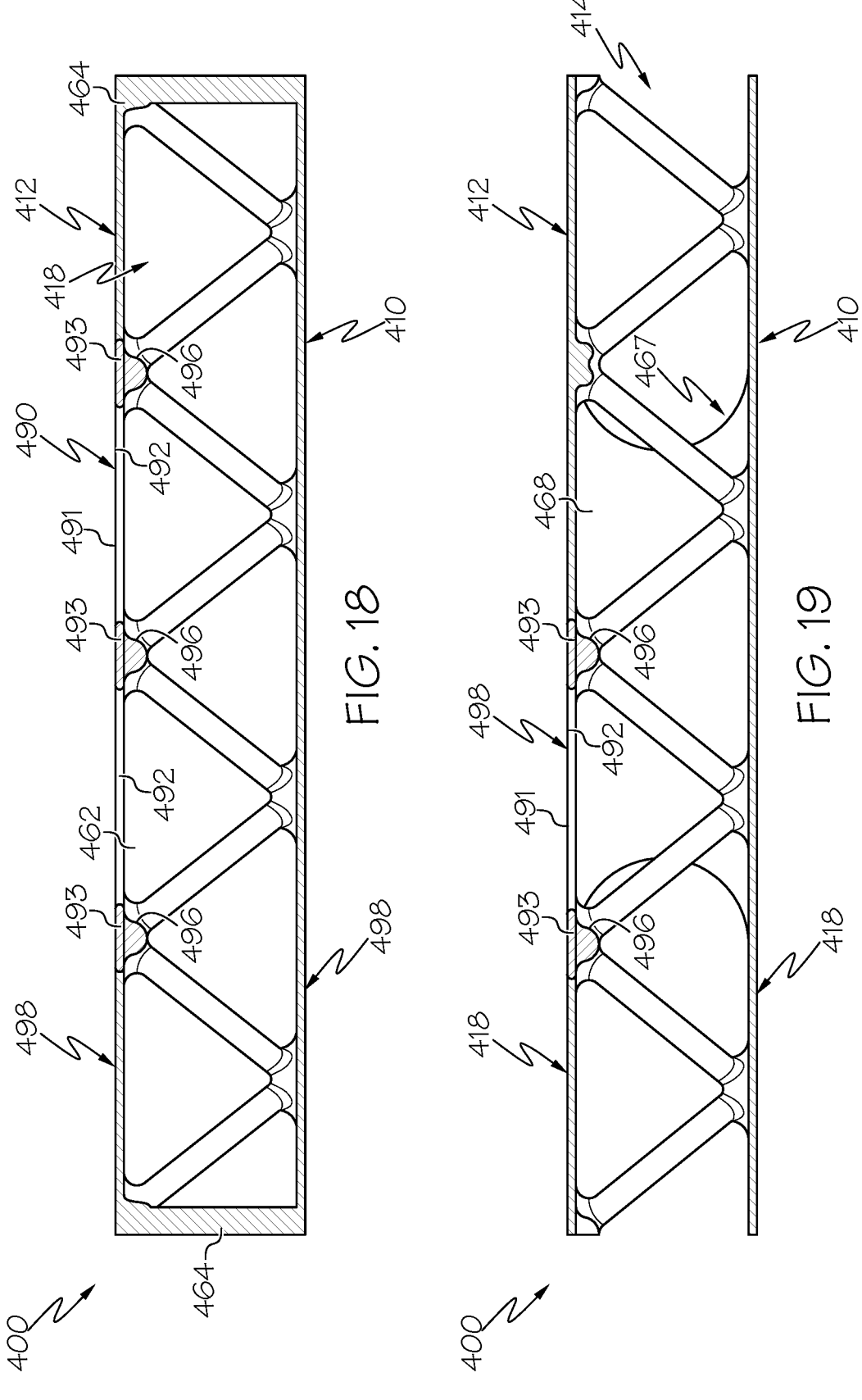
Figures 20, 21:
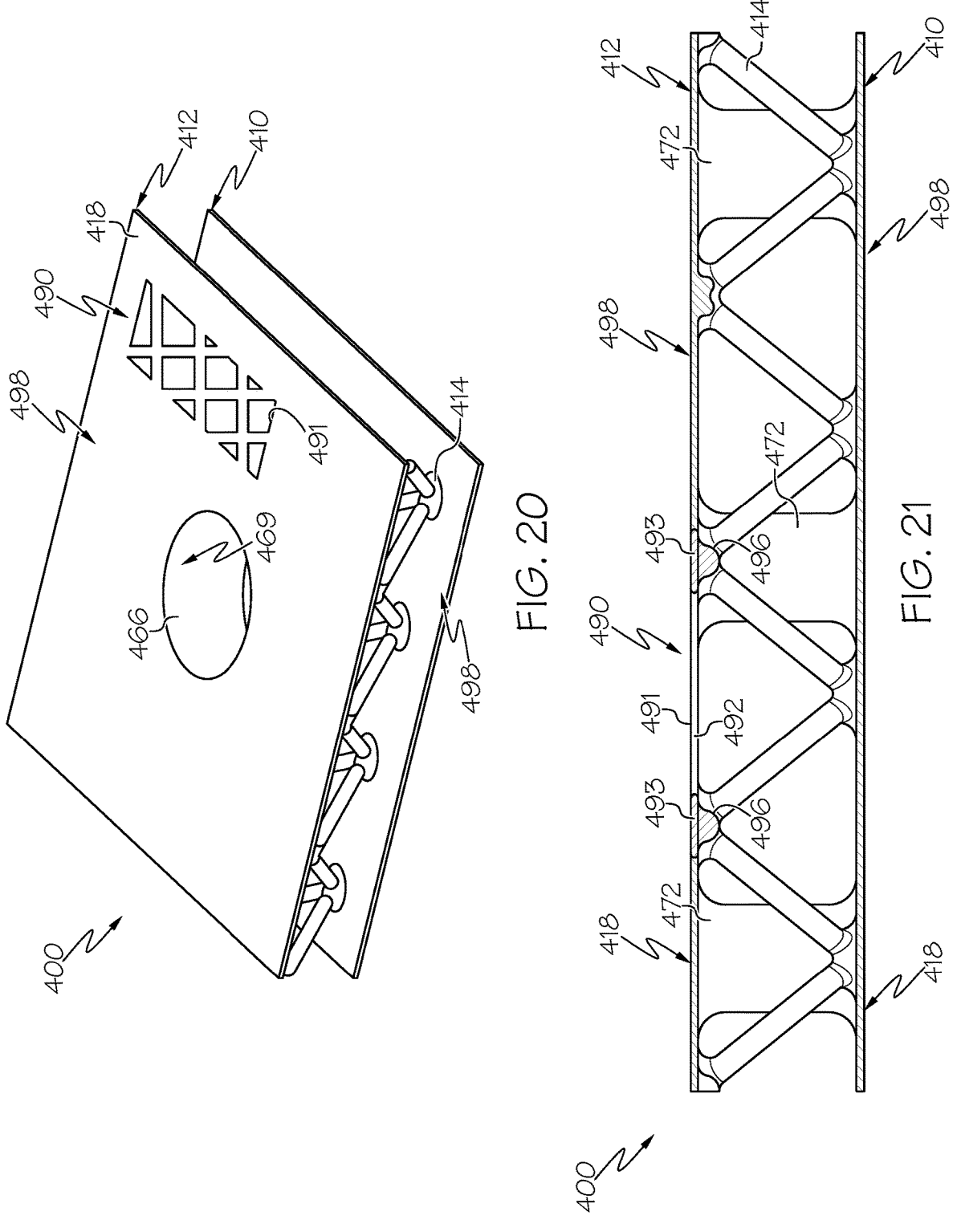
Figure 22:
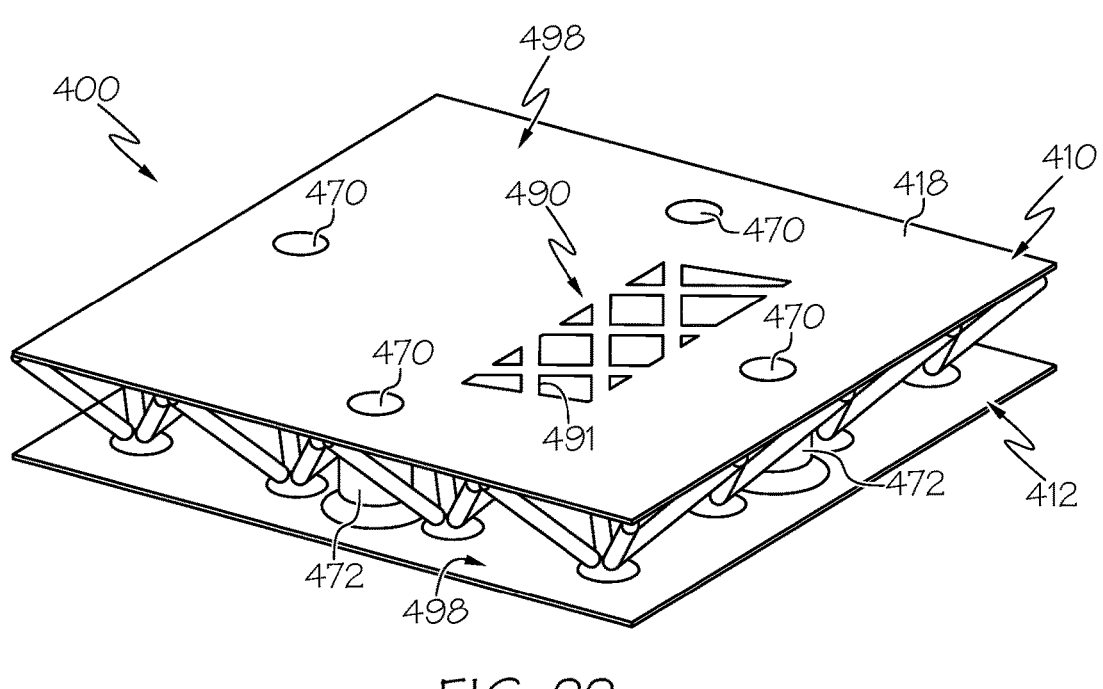
Figure 23:
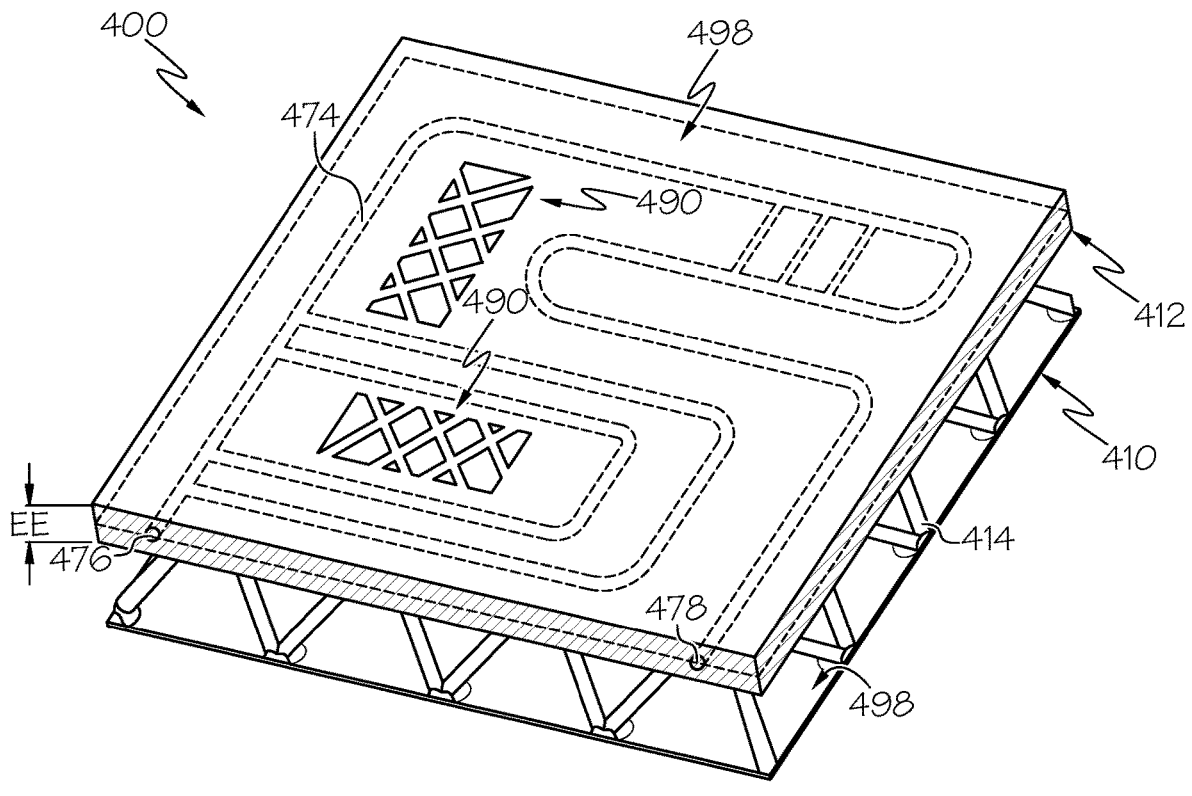
Figure 24:
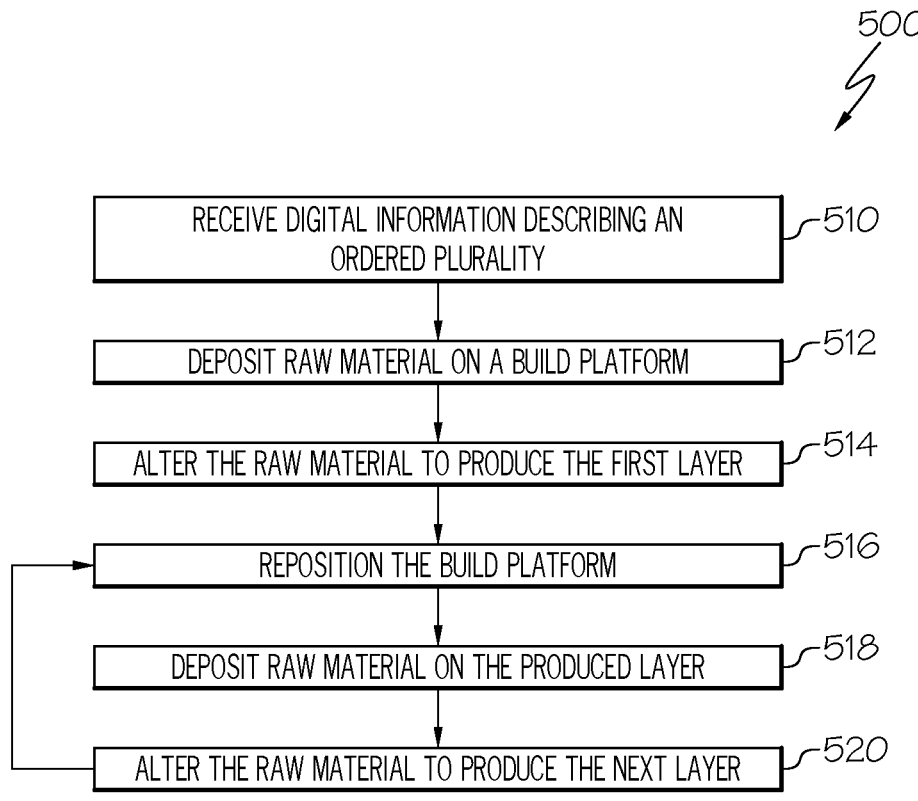
Figures 25, 26:
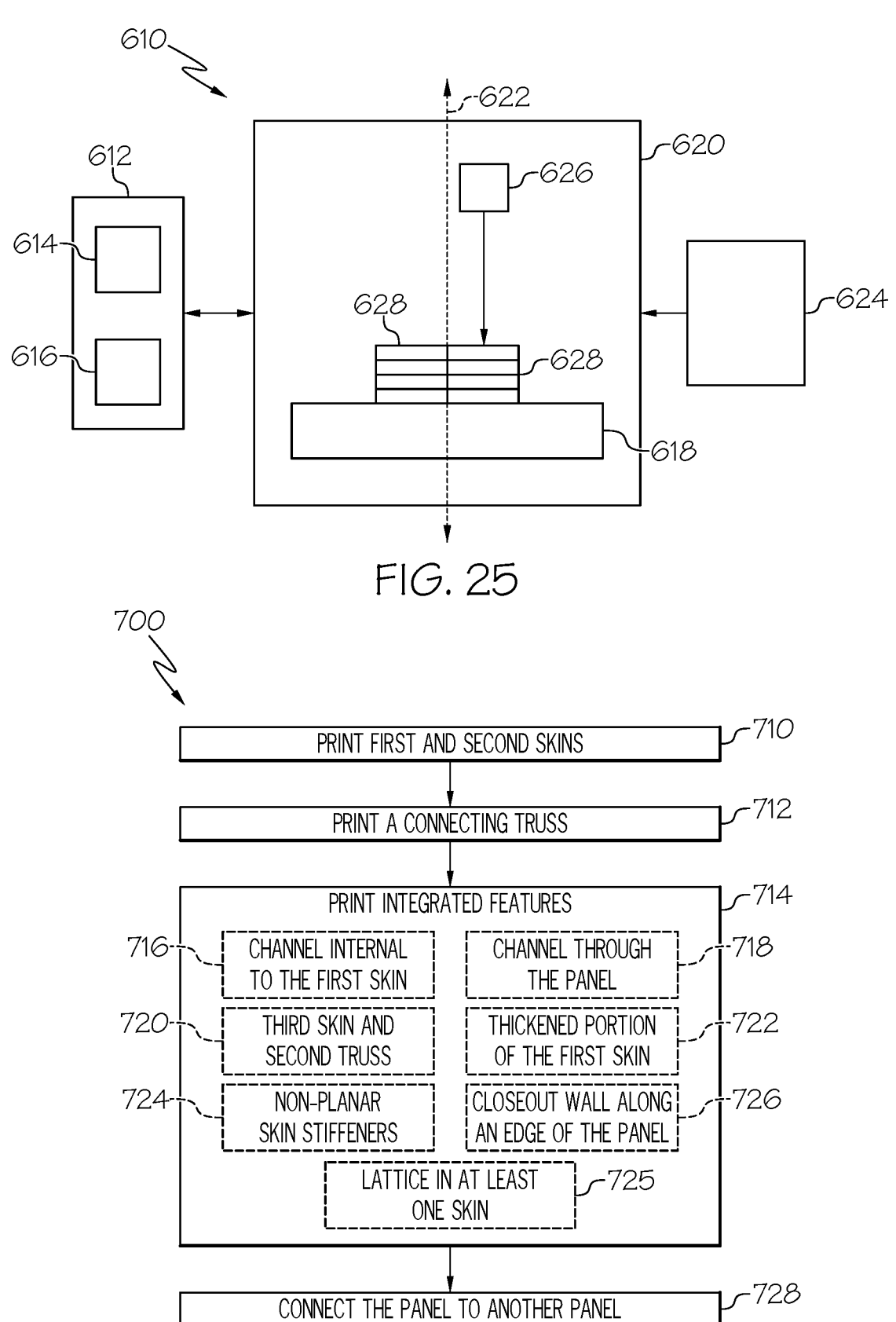
Figure 27:
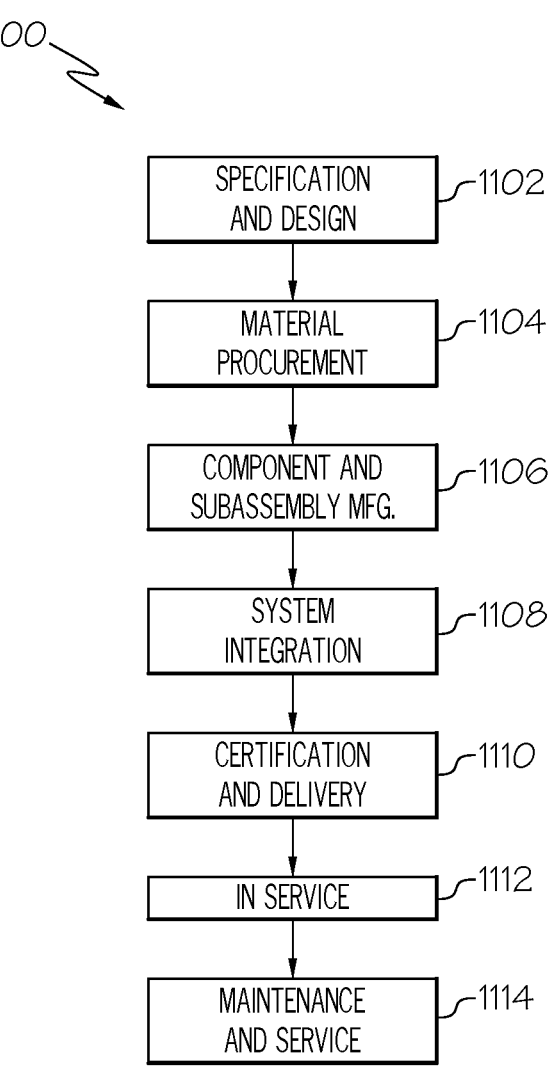
Figure 28:
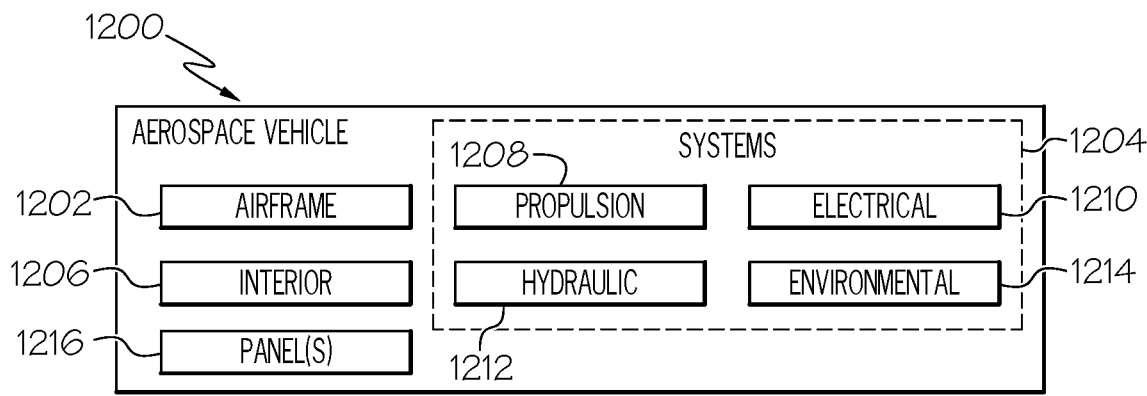
Figure 29:
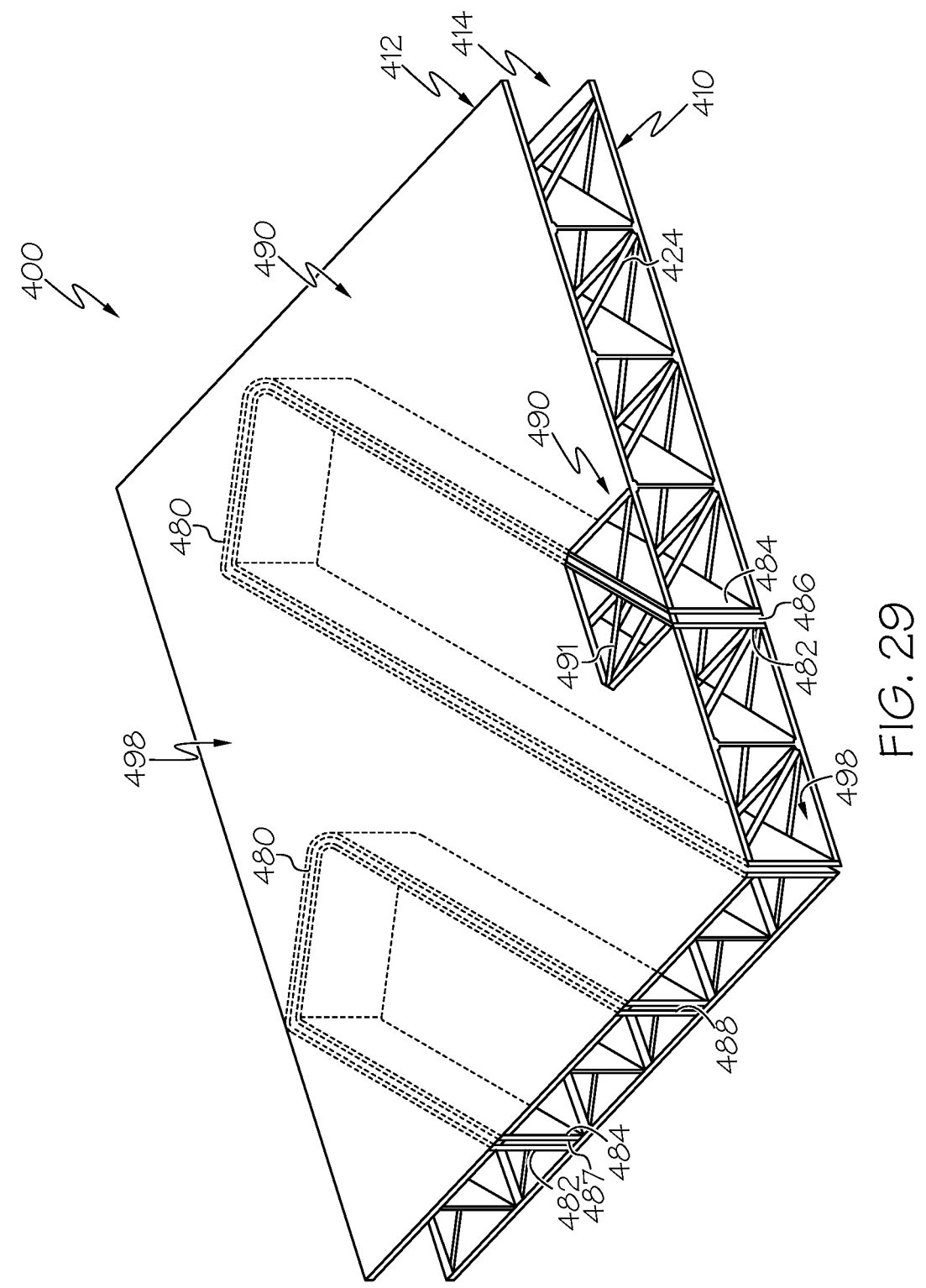

FIG. 5 is a schematic, isometric view of an example of the additively manufactured panel;

FIG. 6 is a schematic, isometric view of an example of the additively manufactured panel;

FIG. 7 is a schematic elevation, sectional view of an example of a portion of the additively manufactured panel;

FIG. 8 is a schematic, isometric view of an example of a core structure of the additively manufactured panel;

FIG. 9 is a schematic, isometric view of an example of a core structure of the additively manufactured panel;

FIG. 10 is a schematic, cross-sectional view of an example of the additively manufactured panel of FIG. 6 taken along lines 10-10;

FIG. 11 is a schematic, elevation, sectional view of an example of a portion of the additively manufactured panel;

FIG. 12 is a schematic, isometric view of an example of the core structure of the additively manufactured panel;

FIG. 13 is a schematic, isometric view of an example of the core structure of the additively manufactured panel;

FIG. 14 is a schematic, elevation, sectional view of an example of the additively manufactured panel;

FIG. 15 is a schematic, elevation view of an example of the additively manufactured panel with a variation in core density;

FIG. 16 is a schematic, elevation view of an example of the additively manufactured panel with a localized thickening of the skins;

FIG. 17 is a schematic, elevation view of an example of the additively manufactured panel with closeout structures;

FIG. 18 is a schematic, elevation view of an example of the additively manufactured panel of FIG. 17, from an orthogonal direction;

FIG. 19 is a schematic, elevation view of an example of the additively manufactured panel with an integrated access hole;

FIG. 20 is a schematic, isometric view of an example of the additively manufactured panel of FIG. 19;

FIG. 21 is a schematic, elevation view of an example of the additively manufactured panel with multiple integrated mounting holes;

FIG. 22 is a schematic, isometric view of an example of the additively manufactured panel of FIG. 21;

FIG. 23 is a schematic, isometric view of an example of the additively manufactured panel with an internal channel embedded in a skin;

FIG. 24 is a flow chart depicting an example of a method for additive manufacturing;

FIG. 25 is a schematic, block diagram of an example of an additive manufacturing apparatus;

FIG. 26 is a flow chart depicting an example of a method for additively manufacturing a panel;

FIG. 27 is a flow diagram of an example of an aerospace vehicle manufacturing and service method;

FIG. 28 is a schematic block diagram of an example of an aerospace vehicle; and FIG. 29 a schematic, isometric view of an example of the additively manufactured panel with an integrated conduit extending between skins.

DETAILED DESCRIPTION

Various aspects and examples of an additively manufactured aerospace panel having a truss structure, as well as related methods, are described below and illustrated in the associated drawings. Unless otherwise specified, an additively manufactured aerospace panel in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through H, each of which is labeled accordingly.

Overview

In general, an additively manufactured aerospace panel in accordance with the present teachings includes two skins connected by a truss structure. The panel is a single additively manufactured unit. The panel may also be described as a sandwich structure, sandwich panel, or sandwich-structured composite material, having two face sheets connected by one or more core structures.

FIG. 1A is a schematic illustration of an example of aerospace vehicle 102, such as a spacecraft. In the illustrated example, aerospace vehicle 102 is depicted as a satellite, such as a communications satellite. In other examples, aerospace vehicle 102 may be a commercial airplane, a helicopter, a high-speed aircraft, an astronomical space observatory, a launch vehicle, an orbital space station, and/or any air-going or space-going craft.

In one or more examples, aerospace vehicle 102 includes a body 104. Body 104 generally serves as the primary structure of aerospace vehicle 102. Body 104 includes one or more additively manufactured truss panels, including panel 100 (FIGS. 1B-1D). Panel 100 may be used for interior or exterior structures of aerospace vehicle 102, and/or may be used for secondary structures, detachable modules, equipment housings, and/or any appropriate structure of aerospace vehicle 102. Advantageously, in some examples, panel 100 may include features configured for the challenges of the space environment.

Referring now to FIGS. 1B-1D, which schematically illustrate examples of a portion of panel 100. In one or more examples, panel 100 includes first skin 110, second skin 112, and truss structure 114. First skin 110 is spaced from second skin 112.

In one or more examples of panel 100, first skin 110 and second skin 112 are at least approximately parallel to one another (e.g., FIG. 1B). In one or more examples of panel 100, at least a portion of first skin 110 and at least a portion of second skin 112 non-parallel to one another (e.g., FIG. 1C). In one or more examples of panel 100, first skin 110 and second skin 112 are concentric to one another (e.g., FIG. 1D).

In one or more examples of panel 100, first skin 110 and second skin 112 are joined together on at least one edge.

In one or more examples, panel 100, first skin 110, and second skin 112 may be understood to have a planar extent. As an example, panel 100, first skin 110, and second skin 112 are generally planar (e.g., FIG. 1B) when viewed along at least orthogonal axis or direction. For example, panel 100 may take the form of a flat panel. In one or more examples, panel 100, first skin 110, and second skin 112 have curvature and/or more complex geometry. As an example, panel 100, first skin 110 and/or second skin 112 are non-planar or otherwise include some degree or curvature or contour in one or more directions (e.g., FIGS. 1C and 1D).

In one or more examples, truss structure 114 is connected to first skin 110 and to second skin 112. First skin 110 and second skin 112 are in turn connected to one another by truss structure 114. Truss structure 114 includes a plurality of truss members 118. In one or more examples, opposed ends of one or more of truss members 118 is coupled to first skin 110 and second skin 112. In one or more examples, opposed ends of each truss member 118 is integral with first skin 110 and second skin 112, such that first skin 110, second skin 112, and truss structure 114 collectively form a single, monolithic joint-free structure.

In one or more examples, truss structure 114 includes an array of core structures 116. Each one of core structures 116 includes or takes the form of a framework of truss members 118 having any appropriate geometry. In one or more examples, the geometry of core structures 116 is uniform over panel 100. In one or more examples, the geometry of core structures 116 varies according to location in panel 100. For example, core structures 116 may vary according to expected non-uniform loading of panel 100 and/or core structures 116 may vary according to a curvature of panel 100, first skin 110, and/or second skin 112. In one or more examples, core structures 116 are arranged in a grid, a repeating pattern, and/or in any effective manner.

In one or more examples of panel 100, at least one of first skin 110 and/or second skin 112 has at least one lattice region 120. At least one lattice region 120 defines or takes the form of lattice 128 (e.g., a lattice structure). Generally, in one or more examples, lattice 128 of lattice region 120 is configured to eliminate secondary printing support during additive manufacture of panel 100. Lattice 128 of at least one lattice region 120 includes a grid of lattice members 122 and an array of openings 124. Lattice 128 includes or takes the form of a pattern or structure made of strips of material (e.g., lattice members 122) that cross over each other, thereby leaving holes (e.g., openings 124) in between. In one or more examples, the strips of material (e.g., lattice members 122) of the lattice 128 cross over each other in a grid, perpendicularly, diagonally, or a combination thereof.

In one or more examples, lattice 128 includes a plurality of lattice stiffeners 136. In one or more examples, each lattice stiffener 136 is disposed on an inner surface of lattice 128. For example, lattice stiffener 136 is coupled to or is integrated with lattice members 122. Lattice stiffener 136 provides stiffening and structural rigidity to lattice members 122. In one or more examples, lattice stiffener 136 increases the thickness of lattice 128 along each lattice member 122.

In one or more examples, at least one of first skin 110 and second skin 112 also includes at least one skin region 126. Skin region 126 includes or takes the form of solid, sheet structure made of continuous material that has no holes or openings. In the examples illustrated in FIGS. 1B-1D, both first skin 110 and second skin 112 include at least one lattice region 120 and at least one skin region 126.

In one or more examples, panel 100 is additively manufactured, or 3D-printed, as a single, unitary structure. As such, panel 100 may also be described as monolithic. In other words, first skin 110, second skin 112, and truss structure 114 are additively manufactured, or printed, together and panel 100 is formed of printed material without joints or seams. As such, panel 100 may have a build axis. As panel 100 is printed, layers of material are deposited in a plane perpendicular to the build axis. In one or more examples, the build axis is parallel to the planar extent of first skin 110 and/or second skin 112. In such examples, panel 100 may also be described as being printed with first skin 110 and second skin 112 in a vertical orientation. Consequently, in such examples, first skin 110, second skin 112, and truss structure 114 may all be printed concurrently rather than sequentially.

In one or more examples, truss members 118 of truss structure 114, or of each core structure 116, are oriented and/or shaped relative to the build axis such that truss members 118 are self-supporting during printing. That is, each core structure 116 can be printed without need for secondary supports or removal of supporting material subsequent to printing. In one or more examples, truss members 118 extend at an angle of no more than forty-five degrees relative to the build axis. In one or more examples, panel 100 includes additional structures and/or features. In such examples, each structure and/or feature may be oriented, shaped, and/or configured to be self-supporting during printing. Panel 100 may be configured for manufacture without post-processing such as machining subsequent to printing.

In one or more examples, panel 100 is customized according to intended use, structural function, and/or placement within an aerospace vehicle, such as a spacecraft. Additive manufacture may allow flexibility in design of panel 100 and incorporation of localized features. In one or more examples, panel 100 includes localized thickening for structural reinforcement, thermal spreading, and/or heat dissipation. In one or more examples, panel 100 includes integrated conductors and/or attachment features, such as fastener-engaging structures. In one or more examples, truss structure 114 is configured to improve resistance to an expected primary loading mode or to be inhomogeneous to match expected load inhomogeneity. Design flexibility and localized features may be especially important for aerospace panels, and challenges of the space environment such as radiation, micrometeoroid, and orbital debris (MMOD) impact, and thermal conditions.

Examples, Components, and Alternatives

The following sections describe selected aspects of exemplary additively manufactured aerospace panels as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Aerospace Panels

Referring to FIGS. 2-5, which schematically illustrate examples of a portion of panel 100, this section describes an illustrative aerospace panel, referred to herein as panel 100. Panel 100 is an example of an additively manufactured truss panel. Panel 100 includes first skin 110 and second skin 112. First skin 110 and second skin 112 are connected by truss structure 114. In one or more examples of panel 100, at least one of first skin 110 and/or second skin 112 has at least one region defining a lattice, referred to herein as lattice region 120. In one or more examples of panel 100, lattice region 120 includes a lattice grid, referred to herein as lattice 128. Lattice 128 includes a grid of lattice members 122 and an array of openings 124. The limits of lattice region 120 can correspond to any combination of the following: underlying geometric features of first skin 110 and/or second skin 112 (e.g., locations of stiffeners), located to enhance the desired local properties of panel 100, or situated discretionarily as needed to meet overall panel design constraints.

In the examples illustrated in FIGS. 2-5, first skin 110 and second skin 112 are generally planar and parallel to each other and, thereby, panel 100 is generally planar. However, in other examples, first skin 110 and second skin 112 can be non-planar and/or non-parallel (e.g., as illustrated in FIGS. 1C and 1D). FIGS. 2-5 illustrate examples of different configurations of lattice region 120 and skin region 126 of first skin 110 and/or second skin 112.

Figure 2:
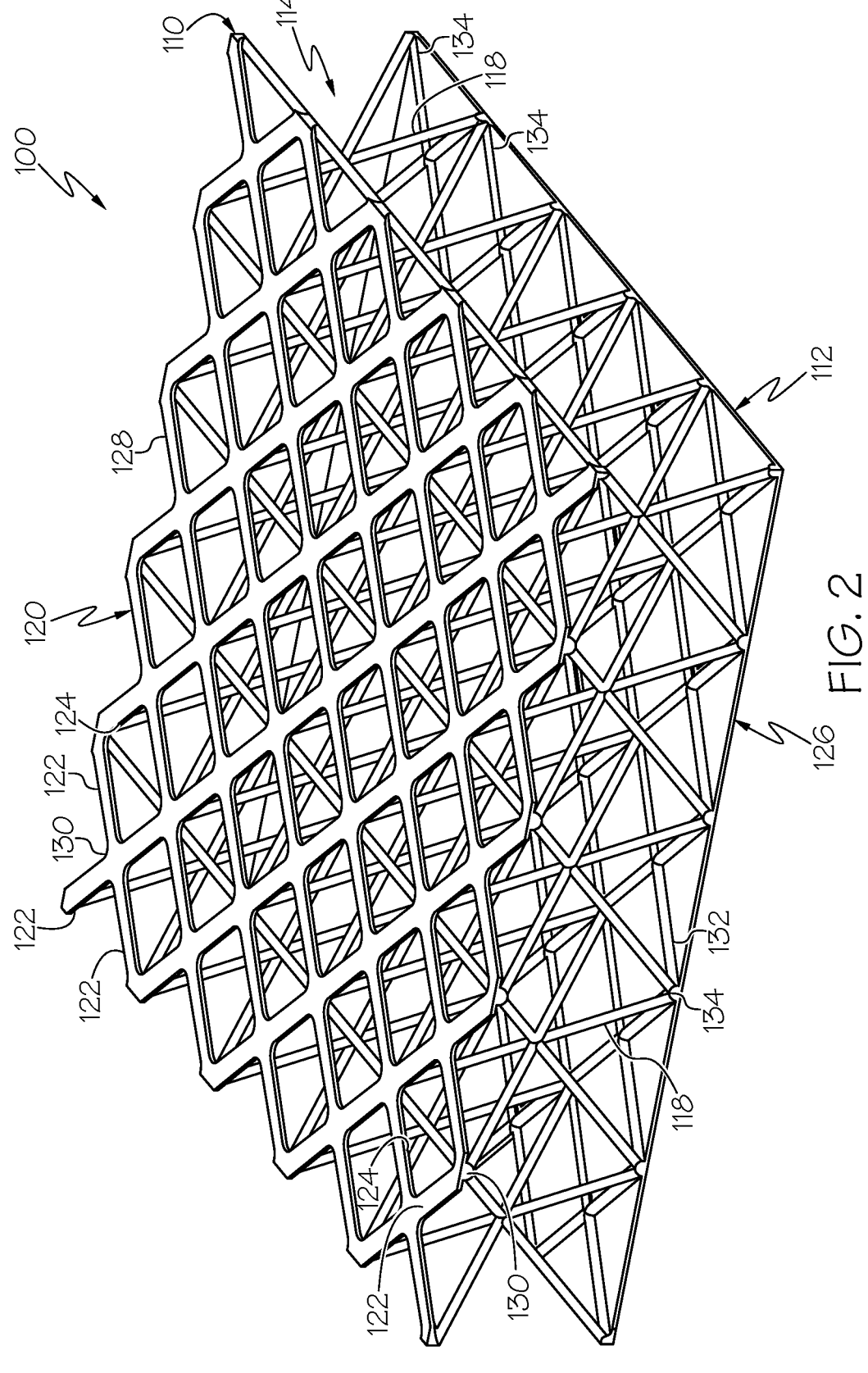
FIG. 2 is a schematic, isometric view of an example of an additively manufactured panel.

As illustrated in FIG. 2, in one or more examples, first skin 110 is formed entirely of lattice region 120. In other words, first skin 110 forms a continuous, lattice face sheet of panel 100. Second skin 112 is formed entirely of skin region 126. In other words, second skin 112 forms a continuous, solid face sheet of panel 100.

Figure 3:
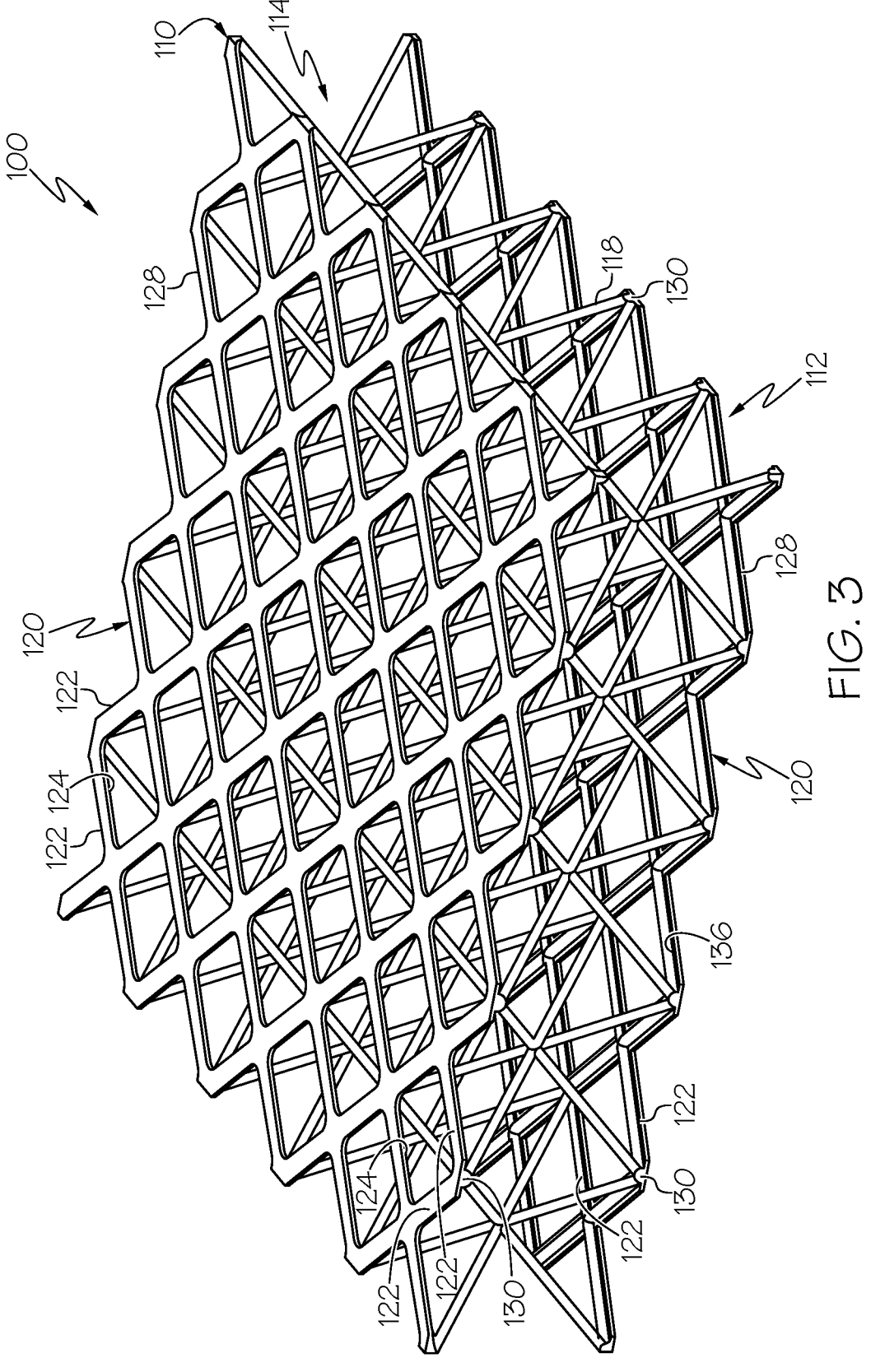
FIG. 3 is a schematic, isometric view of an example of the additively manufactured panel.

As illustrated in FIG. 3, in one or more examples, first skin 110 is formed entirely of lattice region 120. In other words, first skin 110 forms a continuous, lattice face sheet of panel 100. Second skin 112 is formed entirely of lattice region 120. In other words, second skin 112 forms a continuous, lattice face sheet of panel 100.

Figure 4:
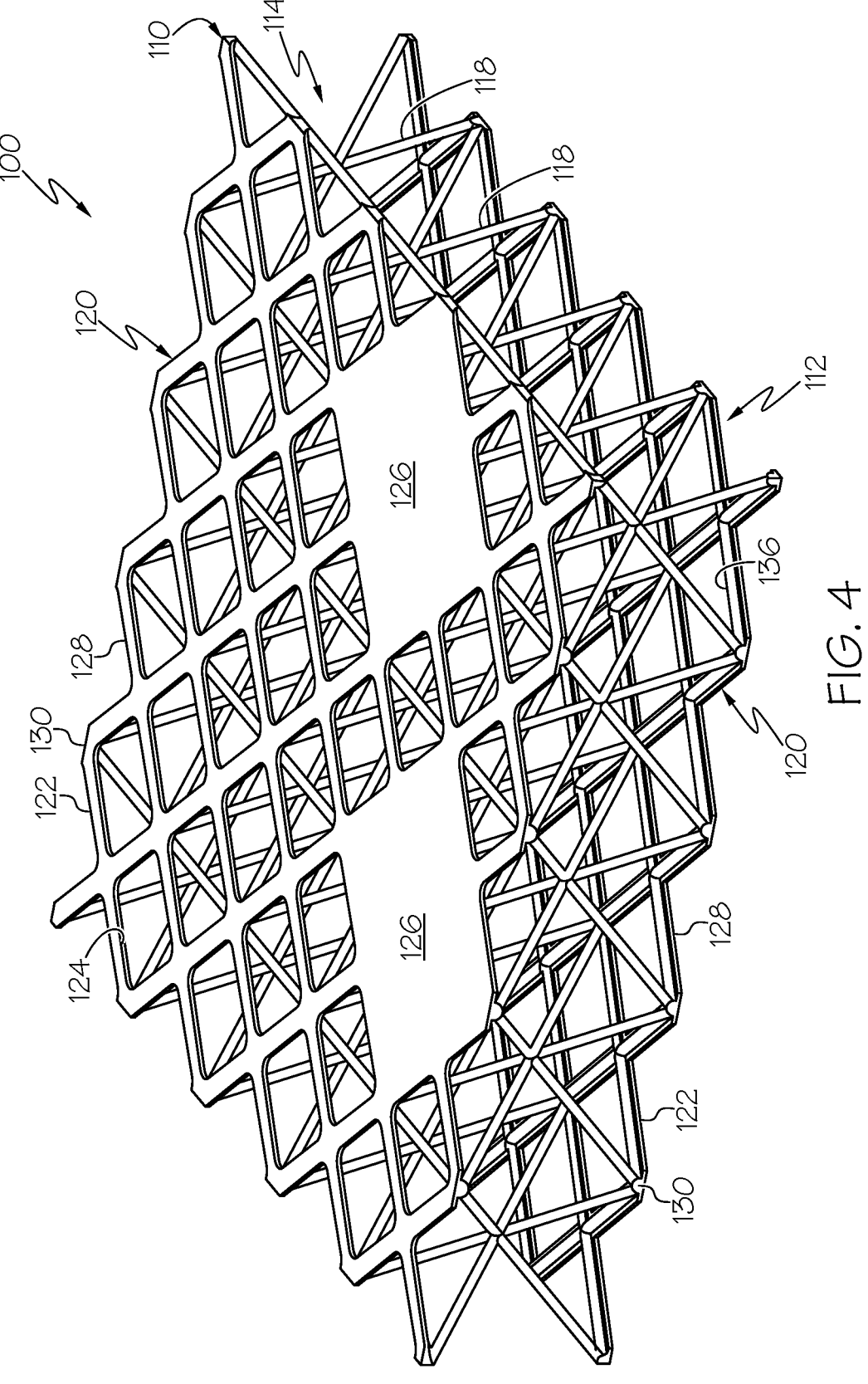
FIG. 4 is a schematic, isometric view of an example of the additively manufactured panel.

As illustrated in FIG. 4, in one or more examples, at least one of first skin 110 and second skin 112 (e.g., first skin 110 in FIG. 4) includes or is formed of lattice region 120 and skin region 126. In the illustrated example, first skin 110 includes two portions formed by skin region 126 (e.g., two skin regions 126) and the remaining portion of second skin 112 is formed by lattice region 120. In the illustrated example, skin regions 126 are located on an interior boundary of first skin 110 and are surrounded by lattice region 120. However, in other examples, first skin 110 and/or second skin 112 can have any number of skin regions 126, skin regions 126 can be disposed at any suitable location along the extend of first skin 110 and/or second skin 112, and skin regions 126 can have any suitable size and/or two-dimensional geometry. In any of these examples, lattice region 120 and skin region 126 share a boundary and extend from and/or between one another to form the extent of first skin 110 and/or second skin 112.

As illustrated in FIG. 5, in one or more examples, at least one of first skin 110 and second skin 112 (e.g., first skin 110 in FIG. 5) includes or is formed of lattice region 120 and skin region 126. In the illustrated example, first skin 110 includes a boundary portion formed by skin region 126 and the remaining interior portion of second skin 112 is formed by lattice region 120. In the illustrated example, skin regions 126 are located along and form the perimeter edges of first skin 110 and surround lattice region 120. However, in other examples, any one or more of the perimeter edges of first skin 110 and/or second skin 112 can be formed entirely by lattice region 120 or can have a portion formed by skin region 126 and a portion formed by lattice region 120. Additionally, the example illustrated in FIG. 5 can also include one or more skin regions 126 located on an interior portion and surrounded by the perimeter portions formed by skin region 126.

In other non-illustrated examples, lattice region 120 and skin region 126 of first skin 110 and/or second skin 112 can have any one of various patterns, layouts, or configurations. The pattern, layout, or configuration of one or more lattice regions 120 and one or more skin regions 126 can depend on the size of panel 100, the end use or application of panel 100, the attachment locations of panel 100 to another structure, and the like.

As illustrated in FIGS. 2-5, regardless of the layout or configuration of lattice region 120 and skin region 126 of first skin 110 and/or second skin 112, first skin 110 and second skin 112 are connected to truss structure 114 and are connected to each other by truss structure 114. In one or more regions of first skin 110 and/or second skin 112 formed from skin region 126, an end of truss member 118 is coupled to or is integral with skin region 126. In one or more regions of first skin 110 and/or second skin 112 formed from lattice region 120, an end of truss member 118 is coupled to or is integral with lattice region 120.

As illustrated in FIGS. 2-5, in examples of panel 100 having at least one lattice region 120, lattice 128 of lattice region 120 includes a plurality of lattice members 122 arranged in a grid or that otherwise intersect or cross over each other (e.g., perpendicularly and/or diagonally) to form a plurality of openings 124 arranged in an array between lattice members 122. One end of each truss member 118 of truss structure 114 is coupled to or integrated with first skin 110 or second skin 112 at lattice node 130 of lattice region 120. In one or more examples, one of a plurality of lattice nodes 130 of lattice region 120 is located at the intersection of two or more lattice members 122 of lattice 128. For example, each lattice member 122 extends in a grid, perpendicularly, or diagonally between two lattice nodes 130.

As illustrated in FIG. 2, in examples of panel 100 having at least one skin region 126, one end of each truss member 118 of truss structure 114 is coupled to or integrated with first skin 110 or second skin 112 at skin node 134 of skin region 126.

As illustrated in FIG. 2, in examples of panel 100 in which lattice region 120 of first skin 110 is opposite skin region 126 of second skin 112, each one of lattice nodes 130 of first skin 110 is generally aligned with one of skin nodes 134 of second skin 112 along an axis that passes perpendicularly through first skin 110 and second skin 112. In one or more examples, each truss member 118 extends between lattice node 130 of first skin 110 and skin node 134 of second skin 112. In one or more examples, each truss member 118 extends diagonally between lattice node 130 of first skin 110 and skin node 134 of second skin 112.

As illustrated in FIG. 3, in examples of panel 100 in which lattice region 120 of first skin 110 is opposite lattice region 120 of second skin 112, each one of lattice nodes 130 of first skin 110 is generally aligned with one of lattice nodes 130 of second skin 112 along an axis that passes perpendicularly through first skin 110 and second skin 112. In one or more examples, each truss member 118 extends between lattice node 130 of first skin 110 and lattice node 130 of second skin 112. In one or more examples, each truss member 118 extends diagonally between lattice node 130 of first skin 110 and lattice node 130 of second skin 112.

Referring again to FIG. 2, in examples of panel 100 in which first skin 110 or second skin 112 includes at least one skin region 126, skin region 126 can also include a plurality of skin stiffeners 132. Each skin stiffener 132 is coupled to or is integrated with skin region 126 and extends between two skin nodes 134. In one or more examples, each skin stiffener 132 extends diagonally between two skin nodes 134.

B. Illustrative Pyramidal Truss Aerospace Panels

Referring now to FIGS. 6-9, this section describes an illustrative pyramidal truss aerospace panel, referred to herein as panel 200. Panel 200 is an example of an additively manufactured truss panel, as described herein above and referred to as panel 100. Panel 200 includes first skin 210 and second skin 212. First skin 210 and second skin 212 are connected by truss structure 214. First skin 210 is an example of first skin 110 (e.g., FIGS. 1B-5). Second skin 212 is an example of second skin 112 (e.g., FIGS. 1B-5). Truss structure 214 is an example of truss structure 114 (e.g., FIGS. 1B-5).

Referring to FIG. 6, which illustrated an example of panel 200. In one or more examples, at least one of first skin 210 and/or second skin 212 collectively has at least one lattice region 250. Lattice region 250 is an example of lattice region 120 (e.g., FIGS. 1B-5.) In one or more examples, lattice region 250 includes lattice 251. Lattice 251 is an example of lattice 128 (e.g., FIGS. 2-5). Lattice 251 includes a grid of lattice members 254 and array of openings 252. Lattice members 254 are examples of lattice members 122 and openings 252 are examples of openings 124 (e.g., FIGS. 2-5).

The limits of lattice region 250 can correspond to any combination of the following: underlying geometric features of the skins 210, 212 (e.g., locations of stiffeners), located to enhance the desired local properties of panel 200, or situated discretionarily as needed to meet overall panel design constraints. Truss structure 214 may be configured to improve a selected strength value of panel 200, such as resistance to shearing, tension, or buckling. In one or more examples, truss structure 214 is configured for resistance to buckling loads.

In one or more examples of panel 200, at least one of first skin 210 and/or second skin 212 has at least one skin region 256. In the example illustrated in FIG. 6, a portion of second skin 212 includes skin region 256 and a portion of second skin 212 includes lattice region 250.

As described further below, each of first skin 210, second skin 212, and truss structure 214 are shaped, featured, and/or configured according to desired properties of panel 200. Panel 200 may be configured for use in any aerospace vehicle. In one or more examples, panel 200 is configured for spacecraft. Panel 200 may function as a structural component, as part of a thermal management system, as radiation shielding, and/or as micrometeoroid and orbital debris (MMOD) shielding for spacecraft, for example.

In one or more examples, panel 200 includes any material or materials appropriate to additive manufacture. Such materials include, but are not limited to, a polymer, a plaster, a ceramic, a metal, or a composite. Polymer materials include thermoplastics (e.g., polyvinyl alcohol (PVA), polydimethylsiloxane (PDMS), polyether-ketone-ketone (PEKK), poly-lactic acid (PLA), nylon, acrylonitrile butadiene styrene (ABS) plastics, Polycarbonate (PC), polyetherimide (PEI), polyimide (PI), polystyrene (PS), polytetrafluoroethylene (PTFE), acrylics such as poly(methyl methacrylate), polypropylene (PP), polyethylene (PE)), thermosets (e.g., photopolymer resin, epoxy), hydrogels, or any combination thereof. Metals include any high strength, high-temperature metal or metal alloy, such as aluminum and its alloys, titanium and its alloys, niobium and its alloys, Inconel, or any combination thereof. In one or more examples, panel 200 includes a laser sintered metal alloy and is manufactured by direct laser metal sintering. In one or more examples, an aluminum alloy may offer an advantageous strength-to-weight ratio and provide effective heat radiation and/or rejection.

Manufacture of first skin 210, second skin 212, and truss structure 214 as a unitary (e.g., metal) structure may improve thermal performance and heat rejection of the panel by removing impedance caused by adhesive materials in traditionally manufactured sandwich panels. Such thermal properties may be especially advantageous for thermal management in a space environment. Additive manufacture of first skin 210 and second skin 212 to include at least one lattice region 250 reduces weight, materials, cost, and cycle time associated with manufacturing panel 200.

In one or more examples, panel 200 is approximately half an inch thick and 3.5 inches wide by 6 inches long. Dimensions of panel 200 may be constrained by the capacity of the apparatus used in manufacture of panel 200. To form panel 200 having desired dimensions beyond the capacity of a selected additive manufacturing apparatus, a plurality of panels, such as panel 200, may be printed separately and joined together. For example, panel 200 may be welded, bonded, and/or fastened to another panel as described herein.

Referring still to FIG. 6, in one or more examples, each of first skin 210 and second skin 212 is planar and rectangular. Each of first skin 210 and second skin 212 has outer surface 218 and inner surface 220 that is opposite and parallel to outer surface 218. In one or more examples, first skin 210 is parallel to second skin 212. In other examples, at least a portion of first skin 210 and at least a portion of second skin 212 are non-parallel. In one or more examples, each of first skin 210 and second skin 212 has a uniform thickness throughout. In one or more examples, each of first skin 210 and second skin 212 are identical. In one or more examples, each of first skin 210 and second skin 212 has a thickness of approximately 0.02 inches. In one or more examples, as discussed further in section D below, one or both of first skin 210 and second skin 212 may vary in thickness and/or one of first skin 210 or second skin 212 may have a greater thickness than the other.

In one or more examples, panel 200 has primary axis 222, which extends parallel to first skin 210 and second skin 212. In one or more examples, primary axis 222 is parallel to a longer side of the rectangular shape of the first skin 210 and second skin 212. In one or more examples, panel 200 is additively manufactured according to (e.g., along or in the direction of) primary axis 222, which may also be described as a build axis or a vertical axis. In other words, panel 200 is printed such that primary axis 222 is aligned with a build direction of an additive manufacturing apparatus. For example, panel 200 is printed onto a build plate by depositing layers of material parallel to the build plate. In such an example, panel 200 is printed with primary axis 222 perpendicular to the build plate.

Because primary axis 222 is parallel to first skin 210 and second skin 212, first skin 210 and second skin 212 may be described as being printed vertically. Each of outer surface 218 and inner surface 220 of first skin 210 and second skin 212 may extend in the build direction throughout printing. In examples of first skin 210 and second skin 212 with lattice regions 250, the primary axis of lattice region 250 is aligned with the primary axis of the corresponding one of first skin 210 and second skin 212 and lattice 251 of lattice region 250 extends in the build direction. Such orientations may allow lattice regions 250 of first skin 210 and second skin 212 to be printed without secondary supports, with a good surface finish, and with limited warping. Such orientation may also reduce the footprint size of panel 200. Additive manufacturing equipment, or 3D printers, typically have a limited print area. For instance, a printer may have a limited build plate surface area. Orienting panel 200 vertically during printing may improve efficiency by allowing multiple panels to be printed simultaneously, in a single deposition run.

Referring to FIG. 7, which illustrates an example of a portion of panel 200, and FIGS. 8 and 9, which illustrate examples of truss structure 214 of panel 200. Truss structure 214 includes a plurality of truss members 224. Truss members 224 are examples of truss members 118 (e.g., FIGS. 1B-5). Truss members 224 are coupled to or are integrated with first skin 210 and second skin 212. In one or more examples, each truss member 224 is approximately cylindrical in shape. In other examples, each truss member 224 has any other suitable cross-sectional shape.

In one or more examples, truss members 224 extend between nodes 226 of first skin 210 and nodes 226 of second skin 212. In one or more examples, each truss member 224 extends between node 226 on inner surface 220 of first skin 210 and node 226 on the inner surface 220 of second skin 212. Nodes 226 are examples of lattice nodes 130 and/or skin nodes 134 (e.g., FIGS. 2-5).

In one or more examples of panel 200, at least one of first skin 210 and/or second skin 212 includes at least one lattice region 250. In one or more examples, the remaining regions of first skin 210 and second skin 212 include skin regions 256. In the example illustrated in FIG. 7, second skin 212 includes lattice region 250 and skin region 256. Lattice region 250 includes lattice 251. Lattice 251 includes lattice members 254. Lattice members 254 intersect or cross over one another to form openings 252. In one or more examples, the lattice members 254 intersect or cross over in a grid pattern, perpendicularly, diagonally, or a combination thereof. In one or more examples, lattice 251 also includes lattice stiffeners 260 that extend along and are integrated with lattice members 254.

In one or more examples, truss structure 214 includes a plurality of stiffeners 228. Stiffeners 228 are examples of skin stiffeners 132 (e.g., FIG. 2) and/or lattice stiffeners 136 (FIG. 3). In one or more examples, stiffeners 228 are non-planar. In one or more examples, stiffeners 228 are triangular. In one or more examples, at least one stiffener 228 is disposed on (e.g., coupled to or integrated with) skin region 256, such as inner surface 220 of first skin 210 or inner surface 220 of second skin 212. In these examples, stiffeners 228 may be referred to as skin stiffeners 262. In one or more examples, at least one stiffener 228 is disposed on (e.g., coupled to or integrated with) lattice region 250, such as inner surface 220 of first skin 210 or inner surface 220 of second skin 212. In these examples, stiffeners 228 may be referred to as lattice stiffeners 260.

In one or more examples, each stiffener 228 has a maximum thickness of approximately 0.04 inches, or twice the thickness of first skin 210 and/or second skin 212. In one or more examples, the maximum thickness of stiffeners 228 is also approximately equal to a diameter of truss members 224. Stiffeners 228 and truss members 224 may have any desired thickness or diameter.

In one or more examples, at least some of lattice stiffeners 260 of lattice 251 of lattice region 250 correspond to at least some of stiffeners 228 of truss structure 214. In these examples, the thickness of lattice member 254 is approximately 0.02 inches and the thickness of lattice stiffener 260 is approximately 0.04 inches, or twice that of lattice member 254, both coincide with the thickness of first skin 210 and/or second skin 212, including any skin stiffeners 262 associated with skin regions 256. Dimensions of stiffeners 228 and/or truss members 224 may be selected according to desired structural properties of panel 200.

In one or more examples, each node 226 is located at one of stiffeners 228. Stiffeners 228 may improve structural properties of first skin 210 and second skin 212, such as stiffness and buckling stability, and may strengthen connection between truss members 224 and first skin 210 and second skin 212. While not required to directly correspond to the skin stiffeners 262, lattice stiffeners 260 can also improve and tailor the structural properties of lattice regions 250 of first skin 210 and/or second skin 212, while further reducing their weight.

Within lattice region 250, each lattice node 255 is located at each intersection of lattice members 254, stiffeners 228 (e.g., lattice stiffeners 260) and/or truss members 224. Lattice nodes 255 are examples of lattice node 130 (e.g., FIGS. 2-5). Within skin region 256, each skin node 258 is located at an intersection of stiffeners 228 (e.g., skin stiffeners 262) and/or truss members 224. Skin nodes 258 are examples of skin nodes 134 (e.g., FIGS. 2-5).

In one or more examples, lattice stiffeners 260 include a section of lattice member 254 (e.g., forming the lattice skin of panel 200) and an integral non-planar support extending along and projecting from lattice member 254. In one or more examples, each integral support (e.g., lattice stiffener 260) is disposed on the inner surface of the lattice 251. In one or more examples of lattice 251, the integral non-planar support of lattice stiffener 260 is a triangular support (e.g., has a triangular cross-sectional shape).

In one or more examples, the thickness of lattice 251 (e.g., the lattice skin) may differ from the skin of skin region 256 outside lattice region 250 to satisfy material strength requirements (e.g., thicker, the same, or thinner). For some lattices 251, lattice member thickness of lattice region 250 may be the same as the corresponding skin thickness of skin region 256 for which the lattice region 250 is located.

In one or more examples of panel 200, the integral non-planar stiffener support for lattice stiffeners 260 may have a larger cross-section, the same cross-section, or a smaller cross-section compared to the corresponding skin stiffeners 262. In some panels, the integral non-planar support of stiffeners 228 have the same cross-sectional area.

For skin regions 256 and lattice regions 250, including stiffeners 228 may allow the thickness of skins 210, 212 to be reduced without sacrificing desired structural properties. Reducing thickness of the skins 210, 212 or other portions of panel 200 or removing sections of skin material, such as by the array of openings 252 of lattice 251, may reduce overall weight, material cost and print time of panel 200. The non-planar cross-sectional shape of the stiffeners 228 may provide effective reinforcement of first skin 210 and second skin 212 with limited material. Stiffeners 228 may also improve the printability of relatively thin instances of first skin 210, second skin 212, and truss structure 214. In other words, stiffeners 228 may reduce or prevent adverse results, such as warping or cracking, which may occur when additively manufacturing thin or delicate structures.

In one or more examples, stiffeners 228, such as lattice stiffeners 260 and/or skin stiffeners 262 are configured to be self-supporting during printing of panel 200. More specifically, the cross-sectional shape of the stiffeners 228 (e.g., triangular) is shaped and oriented to allow self-support. In addition to primary axis 222, panel 200 has a secondary axis 230. Primary axis 222 may also be described as a vertical axis and secondary axis 230 may also be described as a horizontal axis. Secondary axis 230 is perpendicular to primary axis 222 and to first skin 210 and second skin 212. As shown in FIG. 7, each side of the triangular cross-sectional shape of stiffeners 228, such as lattice stiffeners 260 and/or skin stiffeners 262, as applicable, extends at a stiffener angle 232 relative to secondary axis 230. Angle 232 may be at least approximately 35 degrees. In the example depicted in FIG. 7, angle 232 is approximately 40 degrees.

In one or more examples, stiffeners 228, such as lattice stiffeners 260 and/or skin stiffeners 262, are triangle stiffeners (e.g., have a triangular cross-sectional shape). In one or more examples, stiffeners 228, such as lattice stiffeners 260 and/or skin stiffeners 262, have an isosceles triangle cross-sectional shape and angle 232 is matching on each side. In one or more examples, stiffeners 228, such as lattice stiffeners 260 and/or skin stiffeners 262, have a scalene triangle cross-sectional shape or other suitable cross-sectional shape. In such examples, a downward-facing surface of stiffeners 228, such as lattice stiffeners 260 and/or skin stiffeners 262, relative to the build orientation of panel 200 may form an angle of at least approximately 35 degrees relative to secondary axis 230.

Referring to FIGS. 8 and 9, in one or more examples, truss structure 214 includes a plurality of core pyramid frameworks 234, which are arranged in a grid or array. FIGS. 8 and 9 show examples of one of core pyramid frameworks 234, referred to herein as core pyramid 236. Core pyramid 236 includes four truss members 224. Each truss member 224 extends from a separate base node 238 to a single common upper node 240. Base nodes 238 are disposed at the corners of a square shape formed by four sections of stiffeners 228. In one or more examples, base nodes 238 are examples of nodes 226 and upper node 240 is an example of one of nodes 226.

Referring to FIGS. 8 and 9, in one or more examples, core pyramid 236 is oriented with base nodes 238 on first skin 210 and upper node 240 on second skin 212. Base nodes 238 within skin region 256 (e.g., FIG. 8) are examples of skin nodes 258 (FIG. 7). Base nodes 238 within lattice region 250 (e.g., FIG. 9) are examples of lattice nodes 255 (FIG. 7). Upper node 240 within lattice region 250 (e.g., FIGS. 8 and 9) is an example of lattice node 255 (FIG. 7). Upper node 240 within skin region 256 is an example of skin node 258 (FIG. 7).

In one or more examples, stiffeners 228 that extend from upper node 240 within lattice region 250 (e.g., FIGS. 8 and 9) are examples of lattice stiffeners 260 (FIG. 7). Stiffeners 228 that extend from upper node 240 within skin region 256 are examples of skin stiffeners 262 (FIG. 7). Stiffeners 228 that extend from base nodes 238 within skin region 256 (e.g., FIG. 8) are examples of skin stiffeners 262 (FIG. 7). Stiffeners 228 that extend from base nodes 238 within lattice region 250 (e.g., FIG. 9) are examples of lattice stiffeners 260 (FIG. 7).

In one or more examples, core pyramid 236 may be described as having a base at first skin 210 and a vertex at second skin 212 (e.g., as shown in FIG. 7). Alternatively, truss members 224 of truss structure 214 may be viewed as belonging to an array of core pyramids 236 (e.g., core pyramid frameworks 234) each having a base at second skin 212 and a vertex at first skin 210. Panel 200 may accordingly have a symmetrical response to loading. In portions of skins 210, 212 within lattice regions 250, the description of core pyramid 236 is same with the exception that the nodes within lattice regions 250 are replaced by lattice nodes 255 of lattice 251.

In one or more examples, each core pyramid 236 is configured to be self-supporting during printing. More specifically, truss members 224 of core pyramid 236 each extend at angles selected to allow self-support. As shown in FIG. 7, first truss angle 242 is between truss member 224 and secondary axis 230. First truss angle 242 lies in the plane defined by primary axis 222 (FIG. 6) and secondary axis 230 (FIG. 7) of panel 200. A second truss angle, not shown, is also defined between truss member 224 and secondary axis 230 in the plane perpendicular to primary axis 222 but including secondary axis 230.

In one or more examples, each truss angle may be at least approximately 35 degrees and no more than approximately 50 degrees. An angle of approximately 35 degrees or more may allow truss member 224 to be printed without secondary supports. On the other hand, an angle of no more than approximately 50 degrees may ensure that truss structure 214 formed by truss members 224 is sufficiently strong. In the present example, core pyramid 236 has a square base, and as a result first truss angle 242 and second truss angle are equal. In the present example, first truss angle 242 and second truss angle are each approximately 40 degrees.

In one or more examples, each core pyramid 236 may also be configured according to desired structural properties of panel 200. For example, first truss angle 242 and/or second truss angle may be increased or decreased for the purpose of tuning different instantiations of panel 200 to a desired stiffness. For another example, the diameter of each truss member 224 may be increased to improve panel strength or decreased to reduce overall panel weight.

Referring to FIG. 10, which illustrates a cross-sectional view of an example of panel 200, showing the tessellated pattern of core pyramids 236 and off-set grid patterns of stiffeners 228. First skin 210 is covered by the array of core pyramids 236 without gaps or overlaps, with the base of each core pyramid 236 meeting the bases of adjacent core pyramids 236 along stiffeners 228 of first skin 210. Each core pyramid 236 shares base nodes 238 with adjacent core pyramids 236. At side edges 244, core pyramids 236 are truncated and each include only two truss members 224.

In one or more examples, the plurality of stiffeners 228 on first skin 210 form a first square grid 246. The plurality of stiffeners 228 on second skin 212 (FIG. 3) form a second square grid 248. Each square grid 246, 248 includes a first plurality of parallel stiffeners and a second plurality of parallel stiffeners, which intersect the first plurality and are orthogonal to the first plurality. The first and second square grids 246, 248 are offset from each other, such that the intersections of first square grid 246 are vertically aligned with a center of the grid squares of second square grid 248. Intersections of first square grid 246 coincide with base nodes 238, and intersections of second square grid 248 coincide with upper nodes 240 of core pyramids 236.

C. Illustrative Cross Truss Aerospace Panels

Referring now to FIGS. 11-13, this section describes an illustrative cross truss aerospace panel, referred to herein as panel 300. Panel 300 is an example of an additively manufactured truss panel, as described above and as referred to as panel 100. Panel 300 includes first skin 310 and second skin 312. First skin 310 and second skin 312 are connected by truss structure 314. First skin 310 is an example of first skin 110 (e.g., FIGS. 1B-5). Second skin 312 is an example of second skin 112 (e.g., FIGS. 1B-5). Truss structure 314 is an example of truss structure 114 (e.g., FIGS. 1B-5).

Referring to FIG. 11, which illustrates an example of a portion of panel 300. In one or more examples, at least one of first skin 310 and/or second skin 312 has at least one lattice region 350. Lattice region 350 is an example of lattice region 120 (e.g., FIGS. 1B-5.) In one or more examples, lattice region 350 includes lattice 351. Lattice 351 is an example of lattice 128 (e.g., FIGS. 2-5). Lattice 351 includes a grid of lattice members 354 and array of openings 352.

Lattice members 354 are examples of lattice members 122 and openings 352 are examples of openings 124 (e.g., FIGS. 2-5).

In one or more examples of panel 300, at least one of first skin 310 and/or second skin 312 has at least one skin region 356. Skin region 356 is an example of skin region 126 (FIGS. 1B-5). In the example illustrated in FIG. 11, a portion of second skin 212 includes skin region 256 and a portion of second skin 212 includes lattice region 250.

The limits of lattice region 350 can correspond to any combination of the following: underlying geometric features of the skins 310, 312 (e.g., locations of stiffeners), located to enhance the desired local properties of panel 300, or situated discretionarily as needed to meet overall panel design constraints. Truss structure 314 may be configured to improve a selected strength value of panel 300, such as resistance to shearing, tension, or buckling. In one or more examples, truss structure 314 is configured for resistance to buckling loads.

As illustrated in FIG. 11, in one or more examples, each of first skin 310 and second skin 312 is planar and rectangular, with inner surface 320. First skin 310 is parallel to second skin 312. Truss structure 314 includes a plurality of cross or X-shaped truss members 324 extending between nodes 326 of first skin 310 and nodes 326 of second skin 312. In one or more examples, each truss member 324 extends between node 326 on inner surface 320 of first skin 310 and node 326 on the inner surface 320 of second skin 312. Nodes 326 are examples of lattice nodes 130 and/or skin nodes 134 (e.g., FIGS. 2-5).

As illustrated in FIG. 11, in one or more examples, each truss member 324 extends between a pair of nodes 326 on inner surface 320 of first skin 310 and a pair of nodes 326 on the inner surface 320 of second skin 312. In one or more examples, each truss member 324 includes four legs 325. In one or more examples, each truss member 324 is approximately cylindrical in shape. In other examples, each truss member 324 can have any suitable cross-sectional geometry. Each leg 325 extends from node 326 to central join region 327 of truss member 324.

In one or more examples, truss structure 314 includes a plurality of circular bosses 328. Each boss 328 extends perpendicularly from inner surface 320 of either first skin 310 or second skin 312. The circumferential edge of each boss 328 is filleted to improve printability and self-support of bosses 328. In one or more examples, boss 328 is located at each of nodes 326. Bosses may facilitate and strengthen connection between truss members 324 and skins 310, 312.

Referring to FIGS. 12 and 13, which illustrate examples of truss structure 314 of panel 300. In one or more examples, truss structure 314 includes a plurality of core box frameworks 334, which are arranged in a grid or array. FIGS. 12 and 13, show examples of one of core box frameworks 334, referred to herein as core box 336. Core box 336 includes four truss members 324 arranged in a square box shape and with each truss member forming one side of the box. Nodes 326 define the corners of the box shape. One leg 325 of each of two truss members 324 meets at each node 326. One leg 325 of each of truss member 324 extends between a diagonal pair of nodes 326. As an example, each leg 325 of truss member 324 extends from base node 362 to upper node 364 that is diagonally opposite base node 362. In one or more examples, base nodes 362 are examples of nodes 326 and upper nodes 364 are examples of nodes 326.

In one or more examples of truss structure 314, at least a portion of core box frameworks 334 can be located within lattice region 350 and be arranged in alignment with the grid of lattice members 354 of lattice 351. In one or more examples, core box 336 is at least partially inside lattice region 350, such as an upper surface is within lattice region 350 and the lower surface is not. In one or more examples of truss structure 314 within lattice region 350, lattice 351 also include lattice stiffeners 360 and lattice nodes 355, where such lattice nodes 355 define corners of the box shape of core box 336, where one leg 325 of each of two truss members 324 meets at each lattice node 355.

In one or more examples, core box 336 is oriented with base nodes 362 on first skin 310 and upper nodes 364 on second skin 312. Base nodes 362 within skin region 256 (e.g., FIG. 12) are examples of skin nodes 358 (FIG. 11). Base nodes 238 within lattice region 350 (e.g., FIG. 13) are examples of lattice nodes 355 (FIG. 11). Upper nodes 364 within lattice region 350 (e.g., FIGS. 12 and 13) are examples of lattice nodes 355 (FIG. 11). Upper nodes 364 within skin region 256 are examples of skin nodes 358 (FIG. 11).

In one or more examples, truss structure 314 includes a plurality of stiffeners 366. Stiffeners 366 are examples of skin stiffeners 132 (e.g., FIG. 2) and/or lattice stiffeners 136 (FIG. 3). In one or more examples, stiffeners 366 are non-planar. In one or more examples, stiffeners 366 are triangular. In one or more examples, at least one stiffener 366 is disposed on (e.g., coupled to or integrated with) skin region 356, such as inner surface 320 of first skin 310 or inner surface 320 of second skin 312. In these examples, stiffeners 366 may be referred to as skin stiffeners 368. In one or more examples, at least one stiffener 228 is disposed on (e.g., coupled to or integrated with) lattice region 250, such as inner surface 220 of first skin 210 or inner surface 220 of second skin 212. In these examples, stiffeners 366 may be referred to as lattice stiffeners 360.

In one or more examples, stiffeners 366 that extend between upper nodes 364 within lattice region 350 (e.g., FIGS. 12 and 13) are examples of lattice stiffeners 360 (FIG. 11). Stiffeners 366 that extend between upper nodes 364 within skin region 356 are examples of skin stiffeners 368 (FIG. 11). Stiffeners 366 that extend between base nodes 362 within skin region 356 (e.g., FIG. 12) are examples of skin stiffeners 368 (FIG. 11). Stiffeners 366 that extend between base nodes 362 within lattice region 350 (e.g., FIG. 13) are examples of lattice stiffeners 360 (FIG. 11).

In one or more examples, core boxes 336 of core box frameworks 334 may be described as overlapping in truss structure 314. That is, core box 336 may be described as sharing each one of the four truss members 324 with a respective one of four adjacent core boxes 336 of core box frameworks 334. Truss structure 314 may also be described as including a plurality of crisscrossed cylindrical truss members 324. As illustrated in FIGS. 12 and 13, in one or more examples, each of truss members 324 may be described as extending diagonally between node 326 on first skin 310 and node 326 on second skin 312. As illustrated in FIG. 12, in one or more examples, each of truss members 324 may be described as extending diagonally between lattice node 355 of lattice 351 of lattice region 350 of second skin 312 and skin node 358 of skin region 356 of first skin 310. As illustrated in FIG. 13, in one or more examples, each of truss members 324 may be described as extending diagonally between lattice node 355 of lattice 351 of lattice region 350 of second skin 312 and lattice node 355 of lattice region 350 of first skin 310.

In one or more examples, each core box 336 is configured to be self-supporting during printing. More specifically, legs 325 of the core box 336 each extend at angles selected to allow self-support. As shown in FIG. 11, each leg 325 defines truss angle 342 with secondary axis 330 of panel 300. Secondary axis 330 may be perpendicular to a build direction of panel 300 and may be described as a horizontal axis. Each truss angle 342 may be at least approximately 35 degrees. In one or more examples, the sides of core box 336 are square, and truss angles 342 of legs 325 of each truss member 324 are equal. In one or more examples, truss members 324 may form rectangular sides of core box 336, and truss angle 342 may differ between legs 325. In one or more examples, truss angle 342 of each leg 325 is approximately 45 degrees.

D. Illustrative Truss Panel Features

Referring to FIGS. 14-23, this section describes multiple examples of features of an illustrative truss aerospace panel, referred to herein as panel 400. Panel 400 is an example of an additively manufactured truss panel, as described above and as referred to as panel 100. Panel 400 includes first skin 410 and second skin 412. First skin 410 and second skin 412 are connected by truss structure 414. First skin 410 is an example of first skin 110 (e.g., FIGS. 1B-5). Second skin 412 is an example of second skin 112 (e.g., FIGS. 1B-5). Truss structure 414 is an example of truss structure 114 (e.g., FIGS. 1B-5).

In one or more examples, each of first skin 410 and second skin 412 is planar and rectangular, with outer surface 418 and inner surface 420. In one or more examples, first skin 410 is parallel to second skin 412. In one or more examples, first skin 410 and second skin 412 are non-parallel. In one or more examples, first skin 410 and second skin 412 are concentric. In one or more examples, at least one portion or section of first skin 410 and second skin 412 is parallel and at least another portion or section of first skin 410 and second skin 412 is non-parallel.

In one or more examples of panel 400, at least one of first skin 410 or second skin 412 includes at least one lattice region 490. Lattice region 490 is an example of lattice region 120 (FIGS. 1B-5). Lattice region 490 includes lattice 491. Lattice 491 is an example of lattice 128 (FIGS. 1B-5). Lattice 491 includes a grid of lattice members 493 and array of openings 492. Lattice members 493 are examples of lattice members 122 and openings 492 are examples of openings 124 (e.g., FIGS. 2-5). In one or more examples, lattice 491 includes lattice stiffeners 496 that extend along or correspond to lattice members 493. In one or more examples, lattice 491 includes lattice nodes 495 (FIG. 14). Lattice nodes 495 are examples of lattice nodes 130 (FIGS. 2-5). Lattice members 493 and lattice stiffeners 496 extend through, cross over, or otherwise meet at lattice nodes 495.

In one or more examples of panel 400, at least one of first skin 410 and/or second skin 412 has at least one skin region 498. Skin region 498 is an example of skin region 126 (FIGS. 1B-5). In one or more examples, a portion of first skin 410 and/or second 412 includes skin region 498 and lattice region 490.

In one or more examples, truss structure 414 includes a plurality of truss members 424 extending between nodes 426. Nodes 426 located within skin region 498 can be referred to as skin nodes 497. Skin nodes 497 are examples of skin nodes 134 (FIGS. 2-5). Nodes 426 located within lattice regions 490 can be referred to as lattice nodes 495. Lattice nodes 495 are examples of lattice nodes 130 (FIGS. 2-5). In one or more examples, each truss member 424 extends between node 426 on inner surface 420 of first skin 410 and node 426 on inner surface 420 of second skin 412. In one or more examples, at least one truss member 424 extends between lattice node 495 of lattice of lattice region 490 of second skin 412 and lattice node 495 of lattice region 490 of first skin 410. In one or more examples, at least one truss member 424 extends between lattice node 495 of lattice of lattice region 490 of second skin 412 and skin node 497 of skin region 498 of first skin 410. In one or more examples, each truss member 424 may be approximately cylindrical in shape.

In one or more examples, truss structure 414 includes core pyramids 434, which are each formed of four truss members 424, and which are arranged in a grid, array, and/or tessellation. In one or more examples, truss structure 414 includes core box frameworks, which are each formed of four cross truss members, and which are arranged in a grid, array, and/or tessellation.

Referring to FIG. 14, in one or more examples, truss structure 414 includes a plurality of circular bosses 428. In one or more examples, each boss 428 extends at least approximately perpendicularly from inner surface 420 of either first skin 410 or second skin 412. The circumferential edge of each boss 428 is filleted to improve printability and self-support of the bosses 428. Boss 428 is located at each of nodes 426. Bosses 428 may facilitate and strengthen connection between truss members 424 and skins 410, 412.

FIG. 14 illustrates an example of panel 400 customized for additional strength and stiffness by the addition of third skin 450 and second truss structure 452. In these examples, truss structure 414 may also be referred to as first truss structure 414. In one or more examples, third skin 450 is planar and rectangular and parallel to, but spaced from, second skin 412. Third skin 450 has outer surface 418 and a parallel inner surface 420. In one or more examples, third skin 450 has a uniform thickness throughout, and first, second, and third skins 410, 412, 450 are identical. In one or more examples, each skin 410, 412, 450 has a thickness of approximately 0.02 inches. To tailor the mechanical properties of the panel, lattices 490 may also be introduced in varying skin locations in any combination of first, second or third skins 410, 412, 450.

In one or more examples, third skin 450 is connected to second skin 412 by second truss structure 452. Second skin 412 is sandwiched between second truss structure 452 and first truss structure 414. Outer surface 418 of first skin 410 and of third skin 450 form outer surfaces of panel 400.

In one or more examples, second truss structure 452 is substantially identical to first truss structure 414 and also includes a plurality of truss members 424 extending between nodes 426. Each truss member 424 extends between node 426 on outer surface 418 of second skin 412 and node 426 on inner surface 420 of third skin 450. In one or more examples, second truss structure 452 includes a plurality of core pyramids 434, which are each formed of four truss members 424, and which are arranged in a grid, array, and/or tessellation. In one or more examples, second truss structure 452 includes a plurality of core box frameworks, which are each formed of four cross truss members, and which are arranged in a grid, array, and/or tessellation.

In one or more examples, nodes 426 on outer surface 418 of second skin 412 are aligned with nodes 426 on inner surface 420 of second skin 412. Core pyramids 434 of first truss structure 414 are aligned with core pyramids 434 of second truss structure 452. The relative alignment of the core pyramids 434 of the first and second truss structures 414, 452 may be selected to provide a desired structural reinforcement or other structural interaction between the truss structures 414, 452.

In one or more examples, third skin 450 may be substantially the same as second skin 412 and/or first skin 410. In one or more examples, third skin 450 includes at least one skin region 498. In one or more examples, third skin 450 includes at least one lattice region 490. In one or more examples, third skin 450 may differ from second skin 412 and/or first skin 410. In some examples, second truss structure 452 may differ from first truss structure 414. Third skin 450 may have any desirable thickness and/or curvature, and second truss structure 452 may have any desired geometry. In an example, second truss structure 452 may include a plurality of core box frameworks, as described in Example C and illustrated in FIGS. 11-13. In an example, second truss structure 452 may include a plurality of core pyramid frameworks, as described in Example B and illustrated in FIGS. 6-10. In some examples, panel 400 may further include additional skins and truss structures.

Inclusion of third skin 450 and second truss structure 452 in panel 400 may increase the moment of inertia of the panel, while maintaining buckling stability. Such modification may be particularly desirable for foreign object debris (FOD), micrometeoroid and orbital debris (MMOD), or other impact shielding. Such modification may also be used to increase the thickness of panel 400 without reducing desired structural properties such as buckling stability.

Referring to FIG. 15, which illustrates an example of panel 400 tuned for localized stiffness with a variable core density. In the depicted example, panel 400 includes first region 453 and second region 455. Each region 453, 455 includes a portion of first skin 410, second skin 412, and truss structure 414. In first region 453, truss structure 414 has first core configuration 454 and in second region 455, truss structure 414 has second core configuration 456. First region 453 and second region 455 meet at interface 458 between the first and second core configurations 454, 456. In one or more examples of panel 400, at least one of first skin 410 or second skin 412 (second skin 412 in the illustrated example) has lattice region 490 that includes lattice 491, for example, having lattice members 493, openings 492, lattice stiffeners 496, and lattice nodes.

In first core configuration 454, core pyramids 434 have a first density. In second core configuration 456, core pyramids 434 have a second, higher density. In other words, each core pyramid 434 of truss structure 414 has a base span dimension. In first region 453, core pyramids 434 have a first base span dimension AA and in second region 455, core pyramids 434 have a second base span dimension BB. The first base span dimension AA is greater than the second base span dimension BB. In example of panel 400 having one or more lattice 490 (lattice regions), the density of lattices 490 can correspond to the density of core pyramids 434 and have a distribution that correlates to local span dimension AA for the first region and local span dimension BB for the second region.

In one or more examples, core pyramids 434 each have a square base. Accordingly, within each region 453, 455 the core density may be understood to be equal in each direction parallel to the plane of skins 410, 412. In some examples, truss structure 414 may include core pyramids 434 having a rectangular base and/or core structures of other geometries. In such examples, the base span dimension and therefore the density of the core structures may differ according to direction.

In one or more examples, interface 458 may be understood to extend linearly across panel 400. Each of regions 453, 455 may constitute a rectangular section of panel 400. In some examples, regions 453, 455 may have a non-linear interface and/or any desired shape. For instance, first region 453 may have a roughly circular shape and may be surrounded by second region 455. Interface 458 may lie along boundaries between individual core structures, such that no core structure is divided by the interface.

The greater density of second region 455 relative to first region 453 may provide additional stiffness. However, the increased stiffness may have a tradeoff of increased weight and material cost. Varying density over panel 400 may allow stiffness of the panel to be locally tuned. For example, density of the truss core structures may be increased in regions expected to experience stronger or more frequent loading, while density may be decreased in regions expected to experience limited loading.

Referring to FIG. 16, which illustrates an example of panel 400 with a local thickening of skins 410, 412. In the depicted example, panel 400 includes at least one reinforced region 457. In the illustrated example, reinforced region 457 is shown including corresponding thickening of both first skin 410 and second skin 412. In one or more examples, reinforced region 457 may include thickening of only one of first skin 410 and second skin 412, or first skin 410 and second skin 412 may be thickened to a different degree. In one or more examples, reinforced region 457 includes lattice region 490. In one or more examples, reinforced region 457 overlaps or includes both lattice region 490 and skin region 498. In examples in which reinforced region 457 includes at least a portion of lattice region 490, the thickness of lattice members 493 and/or lattice stiffeners 496 are increased to correspond to the increase in skin thickness.

In one or more examples, outside of reinforced region 457, second skin 412 has a thickness CC. Inside reinforced region 457, second skin 412 has an increased thickness DD. In one or more examples, the increased thickness DD extends inward relative to second skin 412, such that outer surface 418 of second skin 412 remains planar throughout. At the outer boundary of reinforced region 457, second skin 412 includes fillet 459 to provide a gradual transition between the two thicknesses. Fillet 459 may be configured to allow reinforced region 457 to be printed without secondary supports. In one or more examples, reinforced region 457 includes matching thickening of first skin 410. In some examples, where reinforced region 457 may overlap with lattice region 490, the increased thickness of lattice members 493 and/or lattice stiffeners 496 extends inward relative to the corresponding first skin 410 and/or second skin 412. Lattice members 493 and lattice stiffeners 496 can be configured to all reinforced regions 457 within lattice region 490 to be printed without secondary supports.

In one or more examples, reinforced region 457 may be understood to be approximately square in shape. In some examples, reinforced region 457 may have a non-linear boundary and any desired shape. For instance, reinforced region 457 may be rectangular, circular, and/or shaped to conform a structure adjacent to panel 400 subsequent to assembly of panel 400 into a structure (e.g., an aerospace vehicle).

In one or more examples, reinforced region 457 may replace shielding that typically includes a separate sheet of metal or other material attached to a sandwich panel. Reinforced region 457 may be configured for radiation shielding of electronics, for example. In such examples, reinforced region 457 may be shaped to match the shielded electronics. Reinforced region 457 be additionally or alternatively configured for thermal management purposes. For example, reinforced region 457 may extend from a thermal output zone of electronic equipment into surrounding portions of the panel to facilitate spreading and rejection of heat generated by the equipment.

In one or more examples, reinforced region 457 may be additionally or alternatively configured for structural reinforcement of panel 400. For example, reinforced region 457 may be a thin strip adjacent to an edge of panel 400 intended for welding to another panel. Reinforced region 457 may compensate for loss of strength in the heat affected zone of the weld join. For another example, reinforced region 457 may extend over a substantial area of second skin 412 to act as an integrated doubler. Such doubling may provide increased panel strength.

Referring to FIGS. 17 and 18, which illustrate examples of panel 400 with integrated closeout walls. The integrated closeout walls may replace separate closeouts typically fastened to a sandwich panel. In the depicted example, panel 400 includes a closeout on each of four edges. Relative to a build orientation, or build axis, the integrated closeout walls of panel 400 may be described as including upper closeout wall 460, lower closeout wall 462, and two side closeout walls 464.

FIG. 17 is a cross-sectional view of an example of panel 400, sectioned along a plane parallel to the build axis and showing the cross-sectional shape of the upper and lower closeout walls 460, 462. In one or more examples, lower closeout wall 462 includes the first printed layers of panel 400 and may be deposited directly onto the support of a build plate. Accordingly, lower closeout wall 462 is planar and perpendicular to the build axis and skins 410, 412. In contrast, in one or more examples, upper closeout wall 460 includes the final printed layers of panel 400. Therefore, in order to be printed without secondary supports, upper closeout wall 460 has an arched, chamfered, or upside-down V shape.

FIG. 18 is a cross-sectional view of an example of panel 400, sectioned along a plane perpendicular to the build axis and showing the cross-sectional shape of side closeout walls 464. Each side closeout wall 464 may extend parallel to the build axis of the panel. Accordingly, side closeout walls 464 are primarily planar. Side closeout walls 464 include a small chamfer or fillet at each corner, where side closeout walls 464 connect to lower closeout wall 462 and upper closeout wall 460.

In one or more examples, each closeout wall extends a full length of the corresponding edge of panel 400. In some examples, a closeout wall may extend only a portion of the length of the panel and/or may include breaks, openings, or apertures. In some examples, panel 400 may include only one, two, or three of the closeout walls. Panel 400 may be designed, configured, and or utilized such that additional localized stiffness and/or strength resulting from the closeout walls can be leveraged. For example, panel 400 may be installed into a structure with upper closeout wall 460 proximate a region of greatest expected loading, to take advantage of the stiffness resulting from the additional material included in the upper closeout wall.

Referring to FIGS. 19 and 20, which illustrate examples of panel 400 with integrated access hole 466. In one or more examples, access hole 466 is located or disposed in skin region 498 of at least one of first skin 410 and/or second skin 412 (e.g., access hole 466 is disposed in skin region 498 of second skin 412 in FIG. 19). In one or more examples, access hole 466 is located or disposed in lattice region 490 of at least one of first skin 410 and/or second skin 412. In one or more examples, access hole 466 is disposed in one of skins 410, 412 in addition to any lattice regions 490.

In one or more examples, access hole 466 extends from outer surface 418 of first skin 410 through the panel to the outer side of second skin 412. In one or more examples, access hole 466 is circular and defined by a generally cylindrical wall 468. Wall 468 connects first skin 410 to second skin 412, similarly to truss structure 414. Wall 468 is disposed between skins 410, 412, in a region of panel 400 that does not include truss structure 414. That is, wall 468 extends through a gap in truss structure 414.

In one or more examples, wall 468 includes outer side 467 (FIG. 19) and inner side 469 (FIG. 20). Inner side 469 is cylindrical and defines access hole 466. Outer side 467 is filleted, having a greatest diameter proximate each of skins 410, 412 and a smallest diameter at a point intermediate to skins 410, 412. The filleted shape of the outer side 467 may help to support wall 468 during printing, allowing printing without secondary supports and maintaining the circularity of access hole 466. The filleted shape of outer side 467 may also provide a strong connection between wall 468 and skins 410, 412 and improve stiffness and/or strength of panel 400 proximate access hole 466.

In the depicted example, access hole 466 is circular. In some examples, access hole 466 may have a diamond shape, or may be shaped according to an intended use. As in the depicted example, the inner and outer sides 469, 467 of the access hole 466 may differ, and may be configured to allow printing without secondary support and within a desired limit for surface roughness.

In one or more examples, panel 400 may include any appropriate number of access holes 466, positioned according to a need for access. For example, access hole 466 may be used to pass cables, pipes, wiring harnesses, and other attachments through panel 400. For another example, access hole 466 may be used for visual inspection or manual maintenance of an interior of a structure which includes panel 400. Integration of access hole 466 into the printed design of panel 400 may replace the typical drilling of access holes in completed sandwich panels.

Referring to FIGS. 21 and 22, which illustrate examples of panel 400 with a plurality of integrated mounting apertures 470. Apertures 470 may be configured to facilitate assembly of multiple panels, mounting of modules or accessories to panels, mounting of modules or accessories to structural members on an opposite side of panels, and/or any desired mounting, fastening, and/or attachment.

In one or more examples, apertures 470 are located or disposed in skin region 498 of at least one of first skin 410 and/or second skin 412 (e.g., apertures 470 are disposed in skin region 498 of second skin 412 in FIG. 22). In one or more examples, apertures 470 are located or disposed in lattice region 490 of at least one of first skin 410 and/or second skin 412. In one or more examples, apertures 470 are disposed in one of skins 410, 412 in addition to any lattice regions 490.

In one or more examples, each aperture 470 extends from outer surface 418 of first skin 410 through panel 400 to the outer surface 418 of second skin 412. In one or more examples, apertures 470 are circular, and each is defined by cylindrical wall 472. Each wall 472 connects first skin 410 to second skin 412, similarly to truss structure 414. Walls 472 are disposed between skins 410, 412, each in a region of panel 400 that does not include truss structure 414. That is, each wall 472 extends through a gap in truss structure 414.

In one or more examples, each wall 472 includes an outer side and an inner side, like that of access hole 466 (FIGS. 19 and 20). The inner side is cylindrical and defines the corresponding aperture 470. The outer side includes a fillet proximate each of skins 410, 412 to provide a strong connection between wall 472 and skins 410, 412 and improve stiffness and/or strength of panel 400 proximate aperture 470. Each wall 472 may be configured for printing without secondary supports. In some examples, the inner side and/or the outer side may have a diamond-shaped cross-section, or other desired shape.

In one or more examples, panel 400 may include any appropriate number of apertures 470, sized and positioned according to the intended mounting or other purpose. In the present example, panel 400 includes four apertures 470 positioned to allow fastening of a square module onto panel 400. Each aperture 470 is sized to receive a bolt to be used in the mounting. In some examples, apertures 470 may be sized to receive threaded bushings in order to allow threaded engagement with panel 400.

Referring to FIG. 23, which illustrates an example of panel 400 with an integrated internal channel 474. In the depicted example, second skin 412 of panel 400 has an increased thickness EE to allow integration of channel 474. In the present example, thickness EE is approximately one quarter inch, and channel 474 has a diameter of approximately 0.02 inches. Channel 474 may be described as embedded in second skin 412 and/or as embedded between second skin 412 and first skin 410. Channel 474 is shown as circular in cross section but may have any cross-sectional shape allowing printing without secondary supports, including a diamond shape.

In one or more examples, channel 474 extends from first aperture 476, through skin 412, to second aperture 478. The example of channel 474 shown in FIG. 17 has an illustrative pattern including multiple turns and branching paths. In some examples, channel 474 may include a single continuous path, dead-ended portions, variations in channel size and/or in proximity to outer surface 418 or inner surface 420 of second skin 412, and/or any desired features. In the depicted example, apertures 476, 478 are disposed in an edge portion of second skin 412. In some examples, one or both apertures 476, 478 may be disposed in outer surface 418, inner surface 420, and/or different edges of second skin 412. In some examples, panel 400 and/or second skin 412 may further include additional structures and/or features configured to allow connection of a fluid management system.

In one or more examples, channel 474 is located or disposed in skin region 498 of at least one of first skin 410 and/or second skin 412 (e.g., channel 474 is disposed in skin region 498 of second skin 412 in FIG. 23). In one or more examples, channel 474 is disposed in one of skins 410, 412 in addition to any lattice regions 490. In one or more examples, channel 474 is routed around or along lattice regions 490.

In one or more examples, channel 474 may be configured according to the intended function of the channel 474. For example, channel 474 may be configured to facilitate active cooling of equipment installed adjacent to panel 400. In such an example, channel 474 may be configured to allow smooth flow of a selected coolant fluid, and to provide substantially exposure of the fluid to a region of the panel adjacent the equipment through inclusion of multiple switchbacks and/or parallel branches. For another example, channel 474 may be configured to allow transportation of a fuel or lubricant through panel 400. In such an example, channel 474 may be configured to allow rapid flow of the fluid with a simple and direct path through the panel.

Referring to FIG. 29, which illustrates an example of panel 400 with an integrated conduit 480. In one or more examples, panel 400 includes a plurality of conduits 480 (e.g., two conduits 480 are shown by example in FIG. 29).

In one or more examples, conduit 480 is a microtube. In the depicted example, conduit 480 extends between and is contact with at least a portion of one or both of first skin 410 and second skin 412. In one or more examples, conduit 480 is in contact with skin region 498 of one or both of first skin 410 and second skin 412. In one or more examples, conduit 480 is in contact with lattice region 490 of one or both of first skin 410 and second skin 412.

In one or more examples. conduit 480 is formed or defined by first wall 482 and second wall 484. First wall 482 and second wall 484 are connected to and extend between first skin 410 and second skin 412. In one or more examples, first wall 482 and second wall 484 run alongside one another to form or define hollow interior 486 of conduit 480 (e.g., a channel). In one or more examples, first wall 482 and second wall 484 are at least approximately parallel to each other. In one or more examples, select ones of truss members 424 of truss structure 414 are omitted and replaced with first wall 482 and second wall 484 of conduit 480. Conduit 480 is shown as rectangular in cross section but may have any suitable cross-sectional shape allowing printing without secondary supports.

In one or more examples, first wall 482 and/or second wall 484 are approximately 0.02 inch (0.05 centimeter) thick. In one or more examples, first wall 482 and second wall 484 are spaced apart from each other by (e.g., a width of hollow interior 486 is) approximately 0.04 inch (0.1 cm). However, other suitable dimensions and/or geometries can be used for conduit 480, first wall 482, second wall 484, and/or hollow interior 486.

In one or more examples, conduit 480 is configured to receive, contain, transfer, or otherwise direct a coolant through an interior of panel 400. As such, coolant contacts or is otherwise in thermal communication with a portion of both first skin 410 and second skin 412 for heat transfer through the thickness of panel 400 and for heat transfer through each one of first skin 410 and second skin 412.

Conduit 480 can have any two-dimensional shape or pattern. In one or more examples, one or more conduits 480 can be connected to or otherwise be in fluid communication with one or more other conduits 480. In one or more examples, conduit 480 extends from first opening 487 to second opening 488. The example of conduit 480 shown in FIG. 29 has an illustrative pattern including multiple turns or paths. In some examples, conduit 480 may include a single continuous path, dead-end portions, variations in size, and/or any desired features. In the depicted example, openings 487, 488 are disposed along a side or edge portion of panel 400. In one or more examples, openings 487, 488 of conduit 480 terminate at a fluid directing manifold (not shown) that is coupled to panel 400. In some examples, panel 400 may further include additional structures and/or features configured to allow connection of a fluid (e.g., coolant) management system to conduit 480.

In one or more examples, conduit 480 is located or disposed between skin region 498 of first skin 410 and second skin 412. In one or more examples, conduit 480 is located or disposed between lattice region 490 of first skin 410 and second skin 412. In one or more examples, conduit 480 is located or disposed between lattice region 490 of first skin 410 and skin region 498 of second skin 412. In one or more examples, a first portion of conduit 480 is located or disposed between lattice regions 490 of first skin 410 and second skin 412 and a second portion of conduit 480 is located or disposed between skin regions 498 of first skin 410 and second skin 412. In one or more examples, conduit 480 is disposed between skins 410, 412 in addition to any lattice regions 490. In one or more examples, conduit 480 is routed around or along lattice regions 490.

In one or more examples, conduit 480 may be configured according to the intended function of the conduit 480. For example, conduit 480 may be configured to facilitate active cooling of equipment installed adjacent to panel 400. In such an example, conduit 480 may be configured to allow smooth flow of a selected coolant fluid, and to provide substantially exposure of the fluid to a region of panel 400 adjacent the equipment through inclusion of multiple switchbacks and/or parallel branches. For another example, conduit 480 may be configured to allow transportation of a fuel or lubricant through panel 400. In such an example, conduit 480 may be configured to allow rapid flow of the fluid with a simple and direct path through the panel.

E. Illustrative Method of Additive Manufacture

Referring to FIGS. 24 and 25, this section describes steps of an illustrative method for additive manufacture of a workpiece (FIG. 25). Aspects of an illustrative additive manufacturing device (FIG. 25) may be utilized in the method steps described below. Where appropriate, reference may be made to components and systems that may be used in carrying out each step. These references are for illustration and are not intended to limit the possible ways of carrying out any particular step of the method.

Referring to FIG. 24, which illustrates a flowchart illustrating steps performed in an example of an additive manufacturing method, referred to herein as method 500. It should be appreciated that the flowchart illustrated in FIG. 24 may not recite the complete process or all steps of method 500. Although various steps of method 500 are described below and depicted in FIG. 24, the steps need not necessarily all be performed, and in some cases may be performed simultaneously or in a different order than the order shown.

In one or more examples, at step 510, digital information describing an ordered plurality of layers is received. The digital information may be received by computer controller 612 of an additive manufacturing device 610 as depicted in FIG. 25. Additive manufacturing device 610 may also be referred to as printer 610 or a fabricator. Computer controller 612 may include any data processing system configured to receive digital design information and control functions of printer 610. The illustrative computer controller shown in FIG. 25 includes processor 614 for controlling printer functions and memory 616 for storing received data.

The received information may include geometric data and/or design details for a plurality of two-dimensional patterns that constitute layers of a three-dimensional object, where the three-dimensional object is workpiece 628 to be manufactured, such as a truss panel (e.g., panel 100, 200, 300, 400). The layers may also be described as cross-sections or slices. The plurality of layers is ordered, such that the layers may be numbered or organized from a first layer to a last layer.

In one or more examples, step 512 of method 500 includes depositing raw material on build platform 618 located in building environment 620 of printer 610. Build platform 618 may include a support moveable by computer controller 612 along manufacturing axis 622. Build platform 618 may have a planar surface perpendicular to manufacturing axis 622.

The raw material may be any material appropriate to additive manufacturing, typically a fluid, filament, sheet, binder suspension, or powder. Raw material can comprise a polymer, a plaster, a ceramic, a metal, or a composite. Polymer raw materials can comprise thermoplastics (e.g., polyvinyl alcohol (PVA), polydimethylsiloxane (PDMS), polyether-ketone-ketone (PEKK), polylactic acid (PLA), nylon, acrylonitrile butadiene styrene (ABS) plastics, Polycarbonate (PC), polyetherimide (PEI), polyimide (PI), polystyrene (PS), polytetrafluoroethylene (PTFE), acrylics such as poly(methyl methacrylate), polypropylene (PP), polyethylene (PE)), thermosets (e.g., photopolymer resin, epoxy), hydrogels, or any combination thereof. Metals can comprise any high strength, high-temperature metal or metal alloy such as aluminum and its alloys, titanium and its alloys, niobium and its alloys, Inconel, or any combination thereof. The material may be distributed from raw material source 624 such as a hopper, a tank, or a powder bed. For example, aluminum powder may be swept from a powder bed over build platform 618 by a brush arm actuated by computer controller 612.

The raw material may be distributed evenly over build platform 618 or may be deposited in a selected pattern. Depositing may be done under the control of computer controller 612. In some examples, build platform 618 may be submerged in raw material and depositing may be accomplished by gravity or fluid pressure. In some examples, print head 626 connected to raw material source 624 may deposit the raw material in a pattern corresponding to the first layer of the ordered plurality of layers.

In one or more examples, at step 514, the raw material is altered to produce the first layer. In other words, a physical change is induced in the deposited material, according to the design information describing the first layer of the ordered plurality of layers and as directed by the computer controller 612, to realize the first layer as a physical object on build platform 618.

The material may be acted on by print head 626 of printer 610, controlled by computer controller 612. For example, print head 626 may include a laser that cures a photopolymer by exposure to light or sinters a metal powder by exposure to heat. Print head 626 may be directed by computer controller 612 to follow a path delineated in the received digital information for the first layer, and/or a path calculated by processor 614 based on the received digital information.

In one or more examples, step 516 includes repositioning build platform 618. In some examples, build platform 618 may start a selected distance from print head 626. The selected distance may be determined by the procedures performed by print head 626. Subsequent to production of a layer, build platform 618 may be repositioned by computer controller 612 along manufacturing axis 622 away from print head 626 by the layer's thickness. That is, build platform 618 may be moved such that the top surface of the produced layer is the selected distance from print head 626.

In some examples, build platform 618 may start in alignment with another element of printer 610 such as a raw material distribution component. Subsequent to production of a layer, build platform 618 may be repositioned by computer controller 612 along manufacturing axis 622 such that a top surface of the produced layer is aligned with the other element of printer 610. In some examples, at step 516 print head 626 may be repositioned instead of or in addition to build platform 618. In some examples, step 516 may be skipped.

In one or more examples, at step 518, raw material is deposited on the layer produced in the preceding step of method 500. As described in step 512, the raw material may be any appropriate material and may be deposited in any appropriate manner. At step 520, the raw material is altered to produce the next layer as previously described for step 514.

In one or more examples, steps 516 through 520 may be repeated to produce each layer of the plurality of layers of the received digital information, until the last layer is produced. The produced first through last layers may then form workpiece 628 as described in the received digital information. Workpiece 628 may be removed from printer 610 and post-processed as desired. For example, workpiece 628 may be machined from a build plate of build platform 618, and then fine details or smooth surfaces may be further finished by machining or other methods.

F. Illustrative Method of Additively Manufacturing an Aerospace Panel

Referring to FIG. 26, this section describes steps of an illustrative method of additively manufacturing an aerospace panel (e.g., panel 100, 200, 300, 400), referred to herein as method 700. Aspects of panels and/or methods described above may be utilized and/or referenced in the method steps described below. Where appropriate, reference may be made to components and systems that may be used in carrying out each step. These references are for illustration and are not intended to limit the possible ways of carrying out any particular step of the method.

FIG. 26 is a flowchart illustrating steps performed in an example of method 700 and may not recite the complete process or all steps of method 700. Although various steps of method 700 are described below and depicted in FIG. 26, the steps need not necessarily all be performed, and in some cases may be performed simultaneously or in a different order than the order shown.

At step 710, the method includes printing a first skin (e.g., first skin 110, 210, 310, 410) and a second skin (e.g., second skin 112, 212, 312, 412). The skins may also be described as face sheets and/or walls. The skins may be printed according to any effective additive manufacturing method, such as method 500 described above and illustrated in FIG. 24. The skins may be printed of any material, including but not limited to thermoplastics, thermosets, ceramics, and laser sintered metal or metal alloy.

In one or more examples, the first skin may be spaced from the second skin and may be parallel to the second skin. In one or more examples, the first skin and the second skin are non-parallel. In some examples of method 700, the skins can join at a common edge. Each skin may have a generally planar extent and a limited thickness. The thickness of the skins may be equal, may differ, and/or may vary over the skins. The skins may be printed according to a build direction of the additive manufacturing apparatus used. Each skin may have an inner side and an outer side, where each of the inner and outer sides extends parallel the build direction during printing. Step 710 may also be described as vertically printing the skins, and/or the skins may be described as parallel to the build direction during printing.

In one or more examples, step 712 of the method includes printing a connecting truss (e.g., truss structure 114, truss structure 214, truss structure 314, truss structure 414). The truss may be connected to the first skin and may be connected to the second skin, thereby connecting the first skin to the second skin. The truss may be described as sandwiched between the first and second skins and/or as forming a core of a panel including the first and second skins.

In one or more examples, the truss includes a plurality of elongate and/or cross-shaped members (e.g., truss members 118, truss members 224, truss members 324, truss members 424) arranged into an array of core structures. Each core structure may include a geometrical framework such as a pyramidal framework or a cuboidal framework. The plurality of elongate truss members may be arranged such that the truss members function as a structural truss and transfer loads between the first skin and the second skin. Each member may be configured and/or oriented such that the truss can be printed without secondary supports. That is, the truss may be printable without need for subsequent removal of sacrificial supporting structures.

In one or more examples, the truss is printed concurrently with the first and second skins. That is, steps 710 and 712 may be performed simultaneously. Each layer of material deposited during printing may include a portion of the first skin, a portion of the truss, and a portion of the second skin. The first and second skins and the truss may be printed as a single, monolithic structure. That is, the skins and the truss may be printed together to form a panel of printed material without joints or seams.

In one or more examples, at step 714, method 700 includes printing integrated features of the panel. Some illustrative optional features are indicated in FIG. 26, but any appropriate structural and/or functional features may be printed as part of step 714. Step 714 and each of sub-steps 716-725 may be performed at least partially concurrently with steps 710 and 712. That is, for some duration of the printing of the first and second skins and the truss structure, integrated features may be simultaneously printed. All printed features may be printed as part of the monolithic structure of the panel. All printed features may be configured for printing without secondary supports.

In one or more examples, sub-step 716 includes printing a channel (e.g., channel 474) internal to the first skin. The first skin may be printed with an increased thickness to allow integration of the channel. Alternatively, or additionally, the channel can be integrated or embedded in the second skin and/or integrated or embedded between the first and second skins. The channel may have any appropriate cross-sectional shape and/or path and may be configured according to the intended function of the channel. For example, the channel may be configured to facilitate heating or cooling of equipment installed adjacent to the panel.

In one or more examples, sub-step 718 includes printing a channel (e.g., access hole 466 and/or apertures 470) through the panel. The channel may extend from an outer side of the first skin through the panel to an outer side of the second skin. The channel may be defined by a tubular wall (e.g., wall 468 or wall 472). For example, the channel may have a circular cross-sectional shape and may be defined by a cylindrical wall. The wall may be disposed between the first and second skins and may extend through a gap in the truss.

In one or more examples, sub-step 720 includes printing a third skin (e.g., third skin 450) and a second truss (e.g., second truss structure 452). The second truss may be substantially identical to the truss printed in step 712 or may have any desired geometry and/or include any appropriate core frameworks. The relative alignment of the core frameworks of the two trusses may be selected to provide a desired structural reinforcement or other structural interaction. The third skin may be parallel to but spaced from the second skin. The first, second, and third skins may be matching in shape and/or thickness. The third skin may be connected to the second skin by the second truss. The second skin may be sandwiched between the second truss and the truss printed in step 712. The first and third skins may form the outer surfaces of the panel.

In one or more examples, sub-step 722 includes printing a thickened portion (e.g., reinforced region 457) of the first skin and/or the second skin. The thickened portion may be rectangular, circular, shaped to conform to a structure adjacent to the panel subsequent to assembly of the panel into a structure, and/or any appropriate shape. The increased thickness may extend inward relative to the skin, such that the outer surface of the skin is unaffected by the thickening. At an outer boundary of the thickened portion, the skin may include a fillet, chamfer, or other shaping configured to provide a gradual transition between the increased thickness and the remainder of the skin. In some examples, sub-step 722 may include printing multiple thickened portions on the first skin and/or one or more thickened portions on the second skin. The thickened portion may include at least a portion of a solid, skin region of the skin, a lattice region of the skin, or both.

In one or more examples, stub-step 724 includes printing non-planar stiffeners, such as skin stiffeners (e.g., skin stiffeners 132, skin stiffener 262, skin stiffener 368) that extend from skin region of skin. The non-planar skin stiffeners can be triangle stiffeners. The skin stiffeners may be printed on the inner side and/or the outer side of the skin region of the first skin and/or the second skin. The skin stiffeners may include an elongate localized thickening of the skin and may be arranged in any appropriate pattern. For example, the skin stiffeners may form a grid and/or a lattice pattern. The skin stiffeners may be located to coincide with nodes of the truss, in order to facilitate connection of the truss members to the first and/or second skins.

In some examples, the step 724 includes a step of printing a first grid of stiffeners with the first skin and a step of printing a second grid of stiffeners with the second skin. In some examples, the step of printing the first grid of stiffeners and the step of printing the second grid of stiffeners, respectively, includes a step of printing the first grid of stiffeners to form one or more first grid squares and a step of printing the second grid of stiffeners to one or more second grid squares. The first grid squares are offset from the second grid squares in a manner such that when the panel is viewed along a direction normal to the first skin, each one of the first nodes is aligned with a geometric center of one of the second grid squares.

In one or more examples, sub-step 725 includes printing in at least one of the first skin and second skin at least one lattice region (e.g., lattice region 120, lattice region 250, lattice region 350, lattice region 490) defining a lattice (e.g., lattice 128, lattice 251, lattice 351, lattice 491) that is configured to eliminate secondary printing support that includes a grid of lattice members and an array of openings. In some examples, the step of printing one or more lattice regions includes a step of printing a grid of lattice stiffeners (e.g., lattice stiffeners 136, lattice stiffeners 260, lattice stiffeners 360, lattice stiffeners 496) with the lattice. In some examples, the grids of the lattice members and the lattice stiffeners form lattice grid squares that can correspond to either the one or more first grid squares or the one or more second grid squares for the skin in which the grid of lattice stiffeners is located.

In one or more examples, sub-step 726 includes printing a closeout wall (e.g., upper closeout wall 460, lower closeout wall 462, and side closeout walls 464) along an edge of the panel. The closeout wall may extend between the first skin and the second skin and may extend perpendicular to both skins. The closeout wall may be configured according to an orientation of the wall relative to a build direction or build axis of the additive manufacturing method used in printing the wall, such that the closeout wall can be printed without secondary supports. For example, a closeout wall extending parallel to the build axis may be substantially planar. For another example, a closeout wall extending perpendicular to the build axis may have a planar face and an angled and/or inverted-V-shaped face. In some examples, sub-step 726 may include printing additional closeout walls along other edges of the panel and/or printing a closeout wall along each edge of the panel.

In one or more examples, step 728 includes connecting the panel to another panel. The panel may be connected along an edge or side region and may be connected in plane or at an angle relative to another panel. The panel may be connected by any effective means. For example, the panel may be welded and/or bolted to an adjacent panel.

In one or more examples, method 700 may not include post-processing of the panel. That is, the panel may be designed and printed such that smoothing of surface roughness, removal of sacrificial supporting material, and/or machining of additional features is not required.

G. Illustrative Examples of an Aerospace Vehicle

Referring to FIGS. 1A-1D, in one or more examples, aerospace vehicle 102 includes body 104. Body 104 includes one or more panels 100. Each of panels 100 includes first skin 110 and second skin 112, which is spaced apart from first skin 110. Each of panels 100 also includes truss structure 114. Truss structure 114 connects first skin 110 and second skin 112. Truss structure 114 includes a plurality of truss members 118. Each truss member 118 is integral with first skin 110 and second skin 112, such that first skin 110, second skin 112, and truss structure 114 collectively form a single monolithic joint-free structure. In one or more examples, at least one of first skin 110 and second skin 112 includes at least one lattice region 120. In the examples illustrated in FIGS. 1B-1D, both first skin 110 and second skin 112 include at least one lattice region 120. At least one lattice region 120 defines or takes the form of lattice 128 (e.g., a lattice structure) configured to eliminate secondary printing support. Lattice 128 of at least one lattice region 120 includes a grid of lattice members 122 and an array of openings 124. In one or more examples, at least one of first skin 110 and second skin 112 also includes at least one skin region 126.

H. Illustrative Implementations of an Aerospace Panel

Referring now to FIGS. 27 and 28, examples of panel 100, 200, 300, 400 and method 700 described herein, may be related to, or used in the context of, a manufacturing and service method 1100, as shown in the flow diagram of FIG. 27 and aerospace vehicle 1200, as schematically illustrated in FIG. 28. As an example, aerospace vehicle 1200 and/or the manufacturing and service method 1100 may include one or more additively manufactured aerospace truss panels, such as panel 100, 200, 300, 400, which is manufactured according to the method 700.

Referring to FIG. 28, which illustrates an example of aerospace vehicle 1200. Aerospace vehicle 1200 is an example of aerospace vehicle 102 (FIG. 1). In one or more examples, aerospace vehicle 1200 includes one or more panels 1216. Panels 1216 are examples of panel 100, 200, 300, 400, as described and illustrated herein, and take the form of additively manufactured truss panels. Generally, aerospace vehicle 1200 includes airframe 1202. In one or more examples, panels 1216 are mounted to airframe 1202. In one or more examples, aerospace vehicle 1200 includes an interior 1206. Aerospace vehicle includes a plurality of onboard systems 1204 (e.g., high-level systems). Examples of onboard systems 1204 of aerospace vehicle 1200 include propulsion systems 1208, hydraulic systems 1212, electrical systems 1210, and environmental systems 1214. In other examples, onboard systems 1204 also includes one or more control systems. In yet other examples, onboard systems 1204 also include one or more other systems, such as, but not limited to, communications systems, avionics systems, software distribution systems, network communications systems, passenger information/entertainment systems, guidance systems, radar systems, weapons systems, and the like.

Referring to FIG. 27, during pre-production of aerospace vehicle 1200, manufacturing and service method 1100 includes specification and design of the aerospace vehicle 1200 (block 1102) and material procurement (block 1104). During production of the aerospace vehicle 1200, component and subassembly manufacturing (block 1106) and system integration (block 1108) of the aerospace vehicle 1200 take place. Thereafter, the aerospace vehicle 1200 goes through certification and delivery (block 1110) to be placed in service (block 1112). Routine maintenance and service (block 1114) includes modification, reconfiguration, refurbishment, etc. of one or more systems of the aerospace vehicle 1200.

Each of the processes of manufacturing and service method 1100 illustrated in FIG. 27 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of panel 100, 200, 300, 400 and method 700, shown and described herein, may be employed during any one or more of the stages of manufacturing and service method 1100 shown in the flow diagram illustrated by FIG. 27. In an example, installation and use of panel 100, 200, 300, 400 and/or manufacture of panel 100, 200, 300, 400 according to method 700 may form a portion of component and subassembly manufacturing (block 1106) and/or system integration (block 1108). Further, installation and use of panel 100, 200, 300, 400 and/or manufacture of panel 100, 200, 300, 400 according to method 700 may be implemented in a manner similar to components or subassemblies prepared while aerospace vehicle 1200 is in service (block 1112). Also, installation and use of panel 100, 200, 300, 400 and/or manufacture of panel 100, 200, 300, 400 according to method 700 may be utilized during system integration (block 1108) and certification and delivery (block 1110). Similarly, installation and use of panel 100, 200, 300, 400 and/or manufacture of panel 100, 200, 300, 400 according to method 700 may be utilized, for example and without limitation, while aerospace vehicle 1200 is in service (block 1112) and during maintenance and service (block 1114).

Illustrative Combinations and Additional Examples

This section describes additional aspects and features of illustrative additively manufactured truss panels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

Clause A0. An additively manufactured (e.g., 3D-printed) panel for aerospace comprising: a first skin; a second skin spaced apart from the first skin; and a first truss structure connecting the first skin to the second skin, the first truss structure includes a plurality of truss members, and each truss member is integral with the first skin and the second skin, such that the first skin, the second skin, and the first truss structure collectively form a single monolithic joint-free structure; wherein at least one of the first skin and the second skin comprises at least one lattice region defining a lattice configured to eliminate secondary printing support that comprises a lattice grid and an array of openings.

Clause A1. The aerospace panel of Clause A0, wherein the first skin comprises a first grid of skin stiffeners; the second skin comprises a second grid of skin stiffeners; and each truss member extends between a first node, defined at an intersection of the first grid of stiffeners, and a second node, defined at an intersection of the second grid of stiffeners; where in the one or more lattice regions.

Clause A2. The aerospace panel of Clause A0 or A1, wherein the lattice grid further comprises one or more grids of lattice stiffeners.

Clause A3. The aerospace panel of any of Clauses A0-A2, wherein the first skin and second skin are parallel.

Clause A4. The aerospace panel of any of Clauses A0-A2, wherein the first skin and second skin are not parallel.

Clause A5. The aerospace panel of any of Clauses A0-A4, wherein the first skin and second skin share a common edge.

Clause A6. The aerospace panel of any of Clauses A0-A5, wherein both the first skin and the second skin have at least one lattice region.

Clause A7. The aerospace panel of any of Clauses A0-A6, wherein both the first skin and the second skin have at least one lattice region, and the lattice regions differ from each other in size and/or location on their respective skin.

Clause A8. The aerospace panel of any of Clauses A0-A7, wherein: the first grid of stiffeners defines one or more first grid squares; the second grid of stiffeners defines one or more second grid squares; the first grid squares are offset from the second grid squares in a manner such that when the aerospace panel is viewed along a direction normal to the first skin, each one of a plurality of first nodes is aligned with a geometric center of one of the second grid squares; and the one or more grids of lattice stiffeners define one or more lattice grid squares corresponding to either the one or more first grid squares or the one or more second grid squares for the skin in which the grid of lattice stiffeners is located.

Clause A9. The aerospace panel of any of Clauses A1-A8, where at least one of the first grid of skin stiffeners and the second grid of skin stiffeners is non-planar.

Clause A10. The aerospace panel of any of Clauses A2-A9, where at least one or more grids of lattice stiffeners is non-planar.

Clause A11. The aerospace panel of any of Clauses A0-A10, further comprising: a closeout wall extending between the first skin and the second skin along at least one edge of the aerospace panel; wherein the first skin, the second skin, the first truss structure, and the closeout wall collectively form the single monolithic joint-free structure.

Clause A12. The aerospace panel of any of Clauses A0-A11, wherein: the plurality of truss members comprises a plurality of X-shaped truss members; and each X-shaped truss member extends between a pair of first nodes on the first skin and a pair of second nodes on the second skin.

Clause A13. The aerospace panel of any of Clauses A0-A12, wherein: the plurality of truss members forms an array of core structures; and the density of the core structures varies over at least one region of the aerospace panel.

Clause A14. The aerospace panel of any of Clauses A0-A13, further comprising: a third skin spaced apart from the second skin; and a second truss structure connecting the second skin to the third skin; wherein the first skin, the second skin, the third skin, the first truss structure, and the second truss structure collectively form the single monolithic joint-free structure.

Clause A15. The aerospace panel of any of Clauses A0-A14, wherein: the aerospace panel has a primary axis parallel to a lengthwise direction of the first skin and the second skin, and a secondary axis perpendicular to the primary axis and normal to the first skin and the second skin; each truss member is oriented at a first truss angle of approximately 35-50 degrees relative to the secondary axis when the aerospace panel is viewed along a direction perpendicular to both the primary axis and the secondary axis; and each truss member is oriented at a second truss angle of approximately 35-50 degrees relative to the secondary axis when the aerospace panel is viewed along the primary axis.

Clause A16. The aerospace panel of any of Clauses A0-A15, wherein at least one of the first skin and the second skin has an internal channel embedded respectively in the first skin and/or the second skin.

Clause A17. The aerospace panel of any of Clauses A0-A16, wherein the panel is comprised of a polymer, a plaster, a ceramic, a metal, or a composite.

Clause A18. The aerospace panel of any of Clauses A0-A16, wherein the panel is comprised of a metal or metal alloy such as aluminum and its alloys, titanium and its alloys, niobium and its alloys, Inconel, or any combination thereof.

Clause B0. An aerospace vehicle, comprising: a body having one or more aerospace panels, each comprising: a first skin; a second skin spaced apart from the first skin; and a first truss structure connecting the first skin to the second skin, the first truss structure includes a plurality of truss members, and each truss member is integral with the first skin and the second skin, such that the first skin, the second skin, and the first truss structure collectively form a single monolithic joint-free structure; where at least one of the first skin and the second skin comprises at least one lattice region defining a lattice configured to eliminate secondary printing support that comprises a grid of lattice stiffeners and an array of openings.

Clause B1. An aerospace vehicle of Clause B0, wherein the vehicle is a satellite.

Clause C0. A method of manufacturing an aerospace panel, comprising: printing a first skin and a second skin spaced apart from the first skin, while simultaneously printing a plurality of truss members of a first truss structure connecting the first skin to the second skin, thereby resulting in a single monolithic joint-free structure; wherein at least one of the first skin and the second skin comprises at least one lattice region defining a lattice configured to eliminate secondary printing support that comprises a lattice grid and an array of openings.

Clause C1. The method of Clause C0, wherein the step of printing the first skin and printing the second skin respectively comprise printing a first grid of stiffeners with the first skin, printing a second grid of stiffeners with the second skin, and printing one or more grids of lattice stiffeners in at least one of the lattice regions; and printing the plurality of truss members comprises printing each truss member to extend between a first node, defined at an intersection of the first grid of stiffeners, and a second node, defined at an intersection of the second grid of stiffeners, where in the one or more lattice regions, the lattice grid comprises one or more grids of lattice stiffeners.

Clause C2. The method of Clause C0 or C1, wherein printing the first grid of stiffeners and printing the second grid of stiffeners respectively comprise: printing the first grid of stiffeners to form one or more first grid squares; printing the second grid of stiffeners to one or more second grid squares; where the first grid squares are offset from the second grid squares in a manner such that when the aerospace panel is viewed along a direction normal to the first skin, each one of the first nodes is aligned with a geometric center of one of the second grid squares; and where the one or more grids of lattice stiffeners form one or more lattice grid squares corresponding to either the one or more first grid squares or the one or more second grid squares for the skin in which the grid of lattice stiffeners is located.

Clause C3. The method of any of Clauses C0-C2, further comprising printing a closeout wall while printing the first skin, the second skin, and the first truss structure; the closeout wall extending between the first skin and the second skin along at least one edge of the aerospace panel.

Clause C4. The method of any of Clauses C0-C3, wherein printing the plurality of truss members comprises printing a plurality of X-shaped truss members, each extending between a pair of first nodes on the first skin and a pair of second nodes on the second skin.

Clause C5. The method of any of Clauses C0-C4, wherein printing the plurality of truss members comprises printing the plurality of truss members as an array of core structures that vary in density over at least one region of the aerospace panel.

Clause C6. The method of any of Clauses C0-C5, further comprising printing a third skin spaced apart from the second skin, and a second truss structure connecting the second skin to the third skin, while printing the first skin, the second skin, and the first truss structure.

Clause C7. The method of any of Clauses C0-C6, wherein: the aerospace panel has a primary axis parallel to a lengthwise direction of the first skin and the second skin, and a secondary axis perpendicular to the primary axis and normal to the first skin and the second skin; and the step of printing the plurality of truss members comprises printing each truss member at a first truss angle of approximately 35-50 degrees relative to the secondary axis when the aerospace panel is viewed along a direction perpendicular to both the primary axis and the secondary axis, and at a second truss angle of approximately 35-50 degrees relative to the secondary axis when the aerospace panel is viewed along the primary axis.

Clause C8. The method of any of Clauses C0-C7, wherein printing the first skin and the second skin comprises printing at least one of the first skin and the second skin with an internal channel embedded in the first skin and/or the second skin.

Clause C9. The method of any of Clauses C0-C8, wherein printing the first skin, the second skin, and the first truss structure comprises printing, using an additive manufacturing apparatus, the aerospace panel in a manner such that the lengthwise direction of the first skin and the second skin is parallel to a build direction of the additive manufacturing apparatus.

Clause C10. The method of any of Clauses C0-C9, wherein the printing material is comprised of a polymer, a plaster, a ceramic, a metal, or a composite.

Clause C11. The method of any of Clauses C0-C9, wherein the printing material is comprised of a metal or metal alloy such as aluminum and its alloys, titanium and its alloys, niobium and its alloys, Inconel, or any combination thereof.

Advantages, Features, and Benefits

The different examples of the additively manufactured truss panels described herein provide several advantages over known solutions for manufacturing aerospace panels. For example, illustrative examples described herein allow rapid, on-demand production of such panels.

Additionally, and among other benefits, illustrative examples described herein reduce manufacturing cycle time, including reducing the number of manufacturing steps, the touch labor time, and the post-production testing.

Additionally, and among other benefits, illustrative examples described herein improve thermal performance and heat rejection, for instance by removing impedance between face sheets and core structures from adhesive materials.

Additionally, and among other benefits, illustrative examples described herein allow structural features such as mounting points, stiffeners, and/or heat pipes to be integrated and manufactured as part of a panel.

Additionally, and among other benefits, illustrative examples described herein allow high levels of customization and localized design, including features such as localized reinforcement or radiation spot shielding, access points, stiffness tuning, tailoring for thermal spreading and heat dissipation, and thickening at weld joins to accommodate strength loss in heat affected zones.

Additionally, and among other benefits, illustrative examples described herein allow for enhanced levels of customization and localized design, including features such as local customized lattices for reduction in materials, stiffness tuning, and tailoring for thermal spreading and heat dissipation.

Additionally, and among other benefits, illustrative examples described herein provide significant applications for aircraft avionics cooling racks and other aircraft structures.

Additionally, and among other benefits, illustrative examples described herein enable the tailoring of the through-panel thermal conductivity of the panel for thermal management by varying (e.g., increasing or decreasing) the density of the truss structure of the panel.

Additionally, and among other benefits, illustrative examples described herein enable the panel to be lighter-weight than comparable composite sandwich panels with solid face sheets by tailoring the design of each one of the face sheets of the panel to include at least one lattice-skin region, at least one solid-skin region, and any combination thereof.

Additionally, and among other benefits, illustrative examples described herein improve upon conventional sandwich panels by enabling additively manufactured micro-truss panels with lattice face sheets. The lattice face sheet can be additively manufactured (e.g., 3D printed) at minimum thickness but significant additional mass reduction by eliminating the material of the face sheets entirely where not needed using the lattice structure. With less face sheet mass, the lattice face sheet panel can be additively manufactured faster because of reduced metal deposition and therefore supports an accelerated production system and lower machine time and machine time cost. The lattice structure of the face sheet can be filled in where needed to accommodate equipment mounting, integral thermal doublers, structural purposes, radiation shielding, and the like or combinations thereof.

No known system or device can perform these functions, particularly for high-strength and light-weight metallic alloy panels. Thus, the illustrative examples described herein are particularly useful for aerospace vehicle structural panels. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

Unless otherwise indicated, all numbers expressing quantities and properties, such as length, weight, and so forth, used in the specification and claims are to be understood as being modified in all instances by the term "about" or "approximately." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical should at least be construed in light of the number of reported significant digits and by applying ordinary rounding techniques.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

The terms "a," "an," "the" and similar referents used in the context of describing the invention (especially in the context of the following claims) are to be construed to cover both the singular and the plural, unless otherwise indicated herein or clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When such inclusion or deletion occurs, the specification is deemed to contain the group as modified, thus fulfilling the written description of all Markush groups used in the appended claims.

Certain embodiments are described herein, including the best mode known to the inventor for carrying out the invention. Of course, variations on these described embodiments will be apparent to those of ordinary skill in the art upon reading the foregoing description. Skilled artisans are expected to employ such variations as appropriate, and the disclosed examples are intended to be practiced other than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

It is understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. An aerospace panel, comprising:
a first skin;
a second skin spaced apart from the first skin; and
a truss structure connecting the first skin to the second skin, the truss structure includes a plurality of truss members, and the truss members extend between first nodes on the first skin and second nodes on the second skin and are integral with the first skin and the second skin, such that the first skin, the second skin, and the truss structure collectively form a single monolithic joint-free structure,
wherein at least a portion of the first skin is formed by a first open lattice comprising a grid of first lattice strips that extend between at least a portion of the first nodes.

2. The aerospace panel of claim 1, further comprising:
a grid of first stiffeners protruding from the first skin, each of the first stiffeners is associated with a first stiffener reference plane,
wherein:
the first nodes are positioned at first intersections of the first stiffeners; and
the first lattice strips are aligned with at least a portion of the first stiffeners, each the first lattice strips is associated with a first skin reference plane that is not coincident with the first stiffener reference plane.

3. The aerospace panel of claim 2, wherein:
the second skin has a grid of second stiffeners;
the second nodes are defined at second intersections of the second grid of stiffeners;
the first stiffeners define one or more first grid units;
the second stiffeners define one or more second grid units; and
the first grid units are offset from the second grid units in a manner such that when the aerospace panel is viewed along a direction normal to the first skin, each one of the first nodes is aligned with a geometric center of one of the second grid units.

4. The aerospace panel of claim 1, wherein at least one of the first skin and the second skin stiffeners is non-planar.

5. The aerospace panel of claim 1, further comprising a closeout wall extending between the first skin and the second skin along at least one edge of the aerospace panel,
    wherein the first skin, the second skin, the truss structure, and the closeout wall collectively form the single monolithic joint-free structure.

6. The aerospace panel of claim 1, wherein:
    the plurality of truss members comprises a plurality of X-shaped truss members; and
    each one of the X-shaped truss members extends between a pair of the first nodes on the first skin and a pair of the second nodes on the second skin.

7. The aerospace panel of claim 1, wherein:
    the plurality of truss members forms an array of core structures; and
    a density of the core structures varies over at least one region of the aerospace panel.

8. The aerospace panel of claim 1, further comprising:
    a third skin spaced apart from the second skin; and
    a second truss structure connecting the second skin to the third skin,
    wherein the first skin, the second skin, the third skin, the truss structure, and the second truss structure collectively form the single monolithic joint-free structure.

9. The aerospace panel of claim 1, wherein:
    the aerospace panel has:
        a primary axis parallel to a lengthwise direction of the first skin and the second skin; and
        a secondary axis perpendicular to the primary axis and normal to the first skin and the second skin;
    each truss member is oriented at a first truss angle of approximately 35 degrees to approximately 50 degrees relative to the secondary axis when the aerospace panel is viewed along a direction perpendicular to both the primary axis and the secondary axis; and
    each truss member is oriented at a second truss angle of approximately 35 degrees to approximately 50 degrees relative to the secondary axis when the aerospace panel is viewed along the primary axis.

10. The aerospace panel of claim 1, wherein at least one of the first skin and the second skin has an internal channel embedded respectively in the first skin and/or the second skin.

11. The aerospace panel of claim 1, wherein at least a portion of the second skin is formed by a second open lattice comprising a grid of second lattice strips that extend between at least a portion of the second nodes.

12. An aerospace vehicle, comprising:
    a body having one or more aerospace panels, each of the aerospace panels comprising:
        a first skin;
        a second skin spaced apart from the first skin; and
        a truss structure connecting the first skin to the second skin, the truss structure includes a plurality of truss members, and the truss members extend between first nodes on the first skin and second nodes on the second skin and are integral with the first skin and the second skin, such that the first skin, the second skin, and the first truss structure collectively form a single monolithic joint-free structure,
    wherein at least a portion of the first skin is formed by a first open lattice comprising a grid of first lattice strips that extend between at least a portion of the first nodes.

13. A method for manufacturing an aerospace panel, the method comprising:
    printing a first skin and a second skin spaced apart from the first skin, while simultaneously printing a plurality of truss members of a first truss structure connecting the first skin to the second skin, thereby resulting in a single monolithic joint-free structure,
    wherein:
        the truss members extend between first nodes on the first skin and second nodes on the second skin; and
        at least a portion of the first skin is formed by a first open lattice comprising a grid of first lattice strips that extend between at least a portion of the first nodes.

14. The method of claim 13, wherein:
    printing the first skin comprises:
        printing a grid of first stiffeners, each of the first stiffeners is associated with a first stiffener reference plane; and
        printing the first lattice strips to be aligned with at least a portion of the first stiffeners, each of the first lattice strips is associated with a first skin reference plane that is not coincident with the first stiffener reference plane;
    printing the second skin comprises printing a grid of second stiffeners; and
    printing the plurality of truss members comprises printing the truss member to extend between the first nodes, defined at first intersections of the first stiffeners, and the second nodes, defined at second intersections of the second stiffeners.

15. The method of claim 14, wherein:
    printing the first stiffeners and printing the second stiffeners respectively comprise:
        printing the first stiffeners to form one or more first grid units; and
        printing the second stiffeners to form one or more second grid units; and
    the first grid units are offset from the second grid units in a manner such that when the aerospace panel is viewed along a direction normal to the first skin, each one of the first nodes is aligned with a geometric center of one of the second grid units.

16. The method of claim 13, further comprising:
    printing a closeout wall while printing the first skin, the second skin, and the truss structure,
    wherein the closeout wall extends between the first skin and the second skin along at least one edge of the aerospace panel.

17. The method of claim 13, wherein:
    printing the plurality of truss members comprises printing a plurality of X-shaped truss members; and
    each one of the X-shaped truss members extends between a pair of the first nodes on the first skin and a pair of the second nodes on the second skin.

18. The method of claim 13, wherein printing the plurality of truss members comprises printing the plurality of truss members as an array of core structures that vary in density over at least one region of the aerospace panel.

19. The method of claim 13, further comprising printing a third skin spaced apart from the second skin, and a second truss structure connecting the second skin to the third skin, while printing the first skin, the second skin, and the truss structure.

20. The method of claim 13, wherein:
    the aerospace panel has:
        a primary axis parallel to a lengthwise direction of the first skin and the second skin; and
        a secondary axis perpendicular to the primary axis and normal to the first skin and the second skin; and printing the plurality of truss members comprises printing each truss member at a first truss angle of 35-50 degrees relative to the secondary axis, when the aerospace panel is viewed along a direction perpendicular to both the primary axis and the secondary axis, and at a second truss angle of 35-50 degrees relative to the secondary axis, when the aerospace panel is viewed along the primary axis.

* * * * *